(12) United States Patent
Oda et al.

(10) Patent No.: US 11,285,761 B2
(45) Date of Patent: Mar. 29, 2022

(54) TIRE

(71) Applicant: BRIDGESTONE CORPORATION, Tokyo (JP)

(72) Inventors: Akinori Oda, Tokyo (JP); Yuji Kajiyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 832 days.

(21) Appl. No.: 15/775,498

(22) PCT Filed: Nov. 11, 2016

(86) PCT No.: PCT/JP2016/083582
§ 371 (c)(1),
(2) Date: May 11, 2018

(87) PCT Pub. No.: WO2017/082412
PCT Pub. Date: May 18, 2017

(65) Prior Publication Data
US 2020/0290405 A1     Sep. 17, 2020

(30) Foreign Application Priority Data
Nov. 12, 2015 (JP) .............................. JP2015-221897

(51) Int. Cl.
*B60C 11/12* (2006.01)
*B60C 11/03* (2006.01)

(52) U.S. Cl.
CPC ...... *B60C 11/1236* (2013.01); *B60C 11/0304* (2013.01); *B60C 11/0306* (2013.01); *B60C 11/1204* (2013.01); *B60C 2011/1213* (2013.01)

(58) Field of Classification Search
CPC ............. B60C 11/1236; B60C 11/0304; B60C 11/0306
See application file for complete search history.

(56) References Cited

U.S. PATENT DOCUMENTS

| 2012/0118458 A1 | 5/2012 | Tobino |
| 2012/0305155 A1 | 12/2012 | Hamanaka |
| 2013/0087260 A1 | 4/2013 | Tobino |

(Continued)

FOREIGN PATENT DOCUMENTS

| CN | 1964859 A | 5/2007 |
| CN | 101395016 A | 3/2009 |

(Continued)

OTHER PUBLICATIONS

Search Report dated Aug. 6, 2019 from the State Intellectual Property Office of the P.R.C. in application No. 201680066294.5.

(Continued)

*Primary Examiner* — Yung-Sheng M Tsui
(74) *Attorney, Agent, or Firm* — Sughrue Mion, PLLC

(57) ABSTRACT

In a pneumatic tire 10 according to the present invention, as an average sipe interval hc defined by an average interval of sipes adjacent to each other in a tire circumferential direction in a center portion block, which is a block arranged at a position including a tire equatorial line, and an average sipe interval hs is defined in a shoulder portion block, which is a block located at an ground contact end in a tire width direction, a relation of 1.05≤(hs/hc)≤4.00 is fulfilled.

3 Claims, 13 Drawing Sheets

(56) References Cited

U.S. PATENT DOCUMENTS

| | | |
|---|---|---|
| 2013/0299053 A1 | 11/2013 | Fugier et al. |
| 2014/0230980 A1* | 8/2014 | Guichon ............... B60C 11/033 152/209.18 |
| 2014/0251519 A1 | 9/2014 | Piffard et al. |
| 2016/0114629 A1 | 4/2016 | Hashimoto |

FOREIGN PATENT DOCUMENTS

| | | |
|---|---|---|
| DE | 102012209246 A1 | 12/2012 |
| EP | 1923234 A1 | 5/2008 |
| JP | 03-182811 A | 8/1991 |
| JP | 11-310013 A | 11/1999 |
| JP | 2000-280712 A | 10/2000 |
| JP | 2004-017739 A | 1/2004 |
| JP | 2007-153056 A | 6/2007 |
| JP | 2008-308010 A | 12/2008 |
| JP | 2009-001176 A | 1/2009 |
| JP | 2010254156 A | 11/2010 |
| JP | 2011-140248 A | 7/2011 |
| JP | 2012-101719 A | 5/2012 |
| JP | 2013-082307 A | 5/2013 |
| JP | 2014-500181 A | 1/2014 |
| JP | 2014-525369 A | 9/2014 |
| JP | 2014-531365 A | 11/2014 |
| WO | 2011111319 A1 | 9/2011 |
| WO | 2014196409 A1 | 12/2014 |

OTHER PUBLICATIONS

International Search Report of PCT/JP2016/083582 dated Feb. 7, 2017 [PCT/ISA/210].

Communication dated Oct. 1, 2018 from the European Patent Office in counterpart application No. 16864373.2.

\* cited by examiner

TIRE

CROSS REFERENCE TO RELATED APPLICATIONS

This application is a National Stage of International Application No. PCT/JP2016/083582, filed Nov. 11, 2016, claiming priority based on Japanese Patent Application No. 2015-221897, filed Nov. 12, 2015, the contents of all of which are incorporated herein by reference in their entirety.

TECHNICAL FIELD

The present invention relates to a tire such as a studless tire, capable of travelling on ice and snow roads.

BACKGROUND ART

Conventionally, in a studless tire having both of performance on ice and snow roads and performance on dry roads, it is extremely important that the performance on the ice and snow roads and the performance on the dry roads are derived to be balanced well.

The studless tire is required to enhance the performance on the dry roads in addition to high performance on the ice and snow roads.

Thus, in order to derive both of driving force on the ice and snow roads (snow traction) and driving force on the dry roads (dry roads) (dry traction) at a high level, a configuration to determine a relation between a density of a sipe formed in a tread and a pitch length defined by a repeating unit of a shape of the tread is disclosed (for example, see Patent Literature 1).

CITATION LIST

Patent Literature

[PTL 1] Japanese Translation of PCT International Application Publication No. 2014-531365

SUMMARY OF INVENTION

In not only a studless tire but also a tire including a land portion block defined by a circumferential direction groove extended in a tire circumferential direction and a lug groove extended in a tire width direction, it is known that, by increasing the number of the sipes formed in the land portion block, an edge component that scratches the road surface can be increased, and therefore braking performance on the ice and snow road, in particular an ice road surface is improved.

On the other hand, when the number of the sipes formed in the land portion block is increased, the rigidity of the land portion block (block rigidity) is deteriorated, and thereby improvement of other performance is interrupted. When the block rigidity is deteriorated, in addition to the deterioration of the braking performance on the ice road surface as described above, especially wear resistant performance on a dry road surface is largely deteriorated.

Specifically, when the number of the sipes formed in the land portion block is increased, the block rigidity of a whole of the land portion block is largely deteriorated. Thus, an end portion of the land portion block at a kick-out side is easily lifted off the road surface in accelerating or braking. As a result, wear of the land portion block proceeds so that the tire lifetime is shortened.

Further, in a winter tire such as a studless tire, it is necessary to stop a car on the ice road surface, namely on-ice performance in a tire circumferential direction required in braking on the ice road surface is important. By forming the sipe in the land portion block, the on-ice performance is improved. Thus, the on-ice performance has been improved by forming as many sipes as possible in one land portion block.

For example, the number of the sipes is increased by arranging the sipes adjacent to each other to face in the tire circumferential direction so as to be parallel to a tire width direction, which is a direction in which an edge effect appears to be close to each other as much as possible, or alternatively, by arranging a side wall at an end in a circumferential direction of the land portion block that receives input in the tire circumferential direction in braking and the sipe to be parallel to each other and to be close to each other as much as possible.

Conventionally, by setting a sipe interval as small as possible and by forming the sipe tightly in the land portion block as described above, the edge effect by an sipe edge has been improved.

Further, a pitch length defined by a length in the tire circumferential direction of a pitch of the land portion block as one basic unit of a tread pattern continuously repeated in the tire circumferential direction, or a length in the circumferential direction of the land portion block is made long so that the rigidity of the land portion block (block rigidity) is increased and the falling of the land portion block is suppressed. Consequently, a ground contact area of the land portion block is increased, and thereby the on-ice performance and the wear resistant performance have been improved.

However, the sipe density in the land portion block has been already increased to its limit, and therefore the sipe interval cannot be made small any more. Further, even if the pitch length is made long and the length in the circumferential direction of the land portion is made long, when the land portion block is finely divided by the sipes, the block rigid is deteriorated.

Further, when the pitch length or the length in the circumferential direction of the land portion is made long, the number of the pitches or the land portion blocks within the ground contact length is decreased. Thus, when the number of the pitches or the land portion blocks is further decreased, the length in the circumferential direction of the land portion becomes long excessively. Consequently, an area of a lug groove is decreased so that draining performance is deteriorated, and a block edge component by the lug groove is not derived. The conventional tire described above cannot solve such problems.

In this way, a certain relation exists between a property of the land portion block and a property of the sipe formed in the land portion block, however there is a room for a further study relating to the relation of the both properties capable of deriving the performance on the ice road surface and the performance on the dry road surface at a high level.

Accordingly, an object of the present invention is, in consideration of the problem described above, to provide a tire such as a studless tire capable of travelling on ice and snow roads including an ice road surface and capable of deriving performance on the ice road surface, performance on a dry road surface, and especially wear resistant performance at a high level.

The present inventors conducted a study of a relation between a vehicle property and a ground contact state of a tire surface relating to improvement of the on-ice performance in braking. As a result, a knowledge that, in a vehicle having an anti-lock brake system (ABS) as generally installed in most vehicles in recent years, a ground contact surface of a tread of the tire contacted with the ice road surface is renewed constantly without locking a wheel in braking and thereby a water screen is hardly interposed between the ice road surface and the tire surface in travelling on the ice road surface, compared to a conventional ABS non-installed vehicle, was obtained.

Based on this knowledge, in the ABS installed vehicle, it was found that the on-ice performance is obtained effectively by securing the ground contact area largely rather than improving the edge effect. Thus, the present inventors conducted a study relating to improvement of the on-ice performance in braking, based on a viewpoint of a configuration of a tire (tread pattern), and as a result, the following techniques were derived.

At first, by setting the sipe interval to be large, the block rigidity can be increased. With this, falling of the land portion block is suppressed, and thereby a ground contact area is increased, force pressing a block edge and the sipe edge against a road surface is increased, and the edge effect is improved. Further, as a result, the wear resistant performance is improved.

Here, in the present invention, the block rigidity denotes the block rigidity in the tire circumferential direction required in braking on the ice road surface unless otherwise mentioned.

Here, when the sipe interval is made large, the number of the sipes formed in the land portion block becomes small, and therefore the edge effect by the sipe edge is deteriorated. Thus, by further setting the pitch length of the land portion block to be small, the number of blocks in a whole circumference of the tire is increased. Consequently, the edge effect by the block edge, which is larger in the edge effect than the edge effect by the sipe edge, is improved instead of the deteriorated edge effect by the sipe edge, so that the total edge effect is improved.

That is, by setting the sipe interval to be large and by setting the pitch length of the land portion block to be small, the block rigidity is increased, and thereby the falling of the land portion block is suppressed and the ground contact area is increased. Further, when the force pressing the block edge and the sipe edge against the road surface is increased and the block edge is improved, the wear resistant performance is improved while improving the total edge effect.

As a result, the braking performance on the ice road surface, the performance on the dry road surface, and especially the wear resistant performance can be obtained at a high level.

Accordingly, in one aspect of the present invention, a tire includes a circumferential direction groove extended in a tire circumferential direction, a lug groove extended in a tire width direction, and a plurality of blocks defined by the circumferential direction groove and the lug groove. At least one of the blocks includes one or more sipes extended in the tire width direction. As an average sipe interval hc is defined by an average interval of the sipes adjacent to each other in the tire circumferential direction in a center portion block, which is the block arranged at a position including a tire equatorial line, and an average sipe interval hs is defined by an average interval of the sipes adjacent to each other in the tire circumferential direction in a shoulder land portion block, which is the block located at a ground contact end in the tire width direction, a relation of $1.05 \leq (hs/hc) \leq 4.00$ is fulfilled.

In one aspect of the present invention, as an average sipe interval $h_2$ is defined by an average interval of the sipes adjacent to each other in the tire circumferential direction in a second land portion block, which is the block located at an outer side in the tire width direction of the center portion block, a relation of $1.00 \leq (h_2/hc) \leq 7.00$ may be fulfilled.

In one aspect of the present invention, s an average sipe interval $h_2$ is defined by an average interval of the sipes adjacent to each other in the tire circumferential direction in a second land portion block, which is the block located at an outer side in the tire width direction of the center portion block, and the average sipe interval hs is defined by the average interval of the sipes adjacent to each other in the tire circumferential direction in the shoulder land portion block, which is the block located at the ground contact end in the tire width direction, a relation of $0.97 \leq (hs/h_2) \leq 2.15$ may be fulfilled.

DESCRIPTION OF EMBODIMENTS

Figure 1:
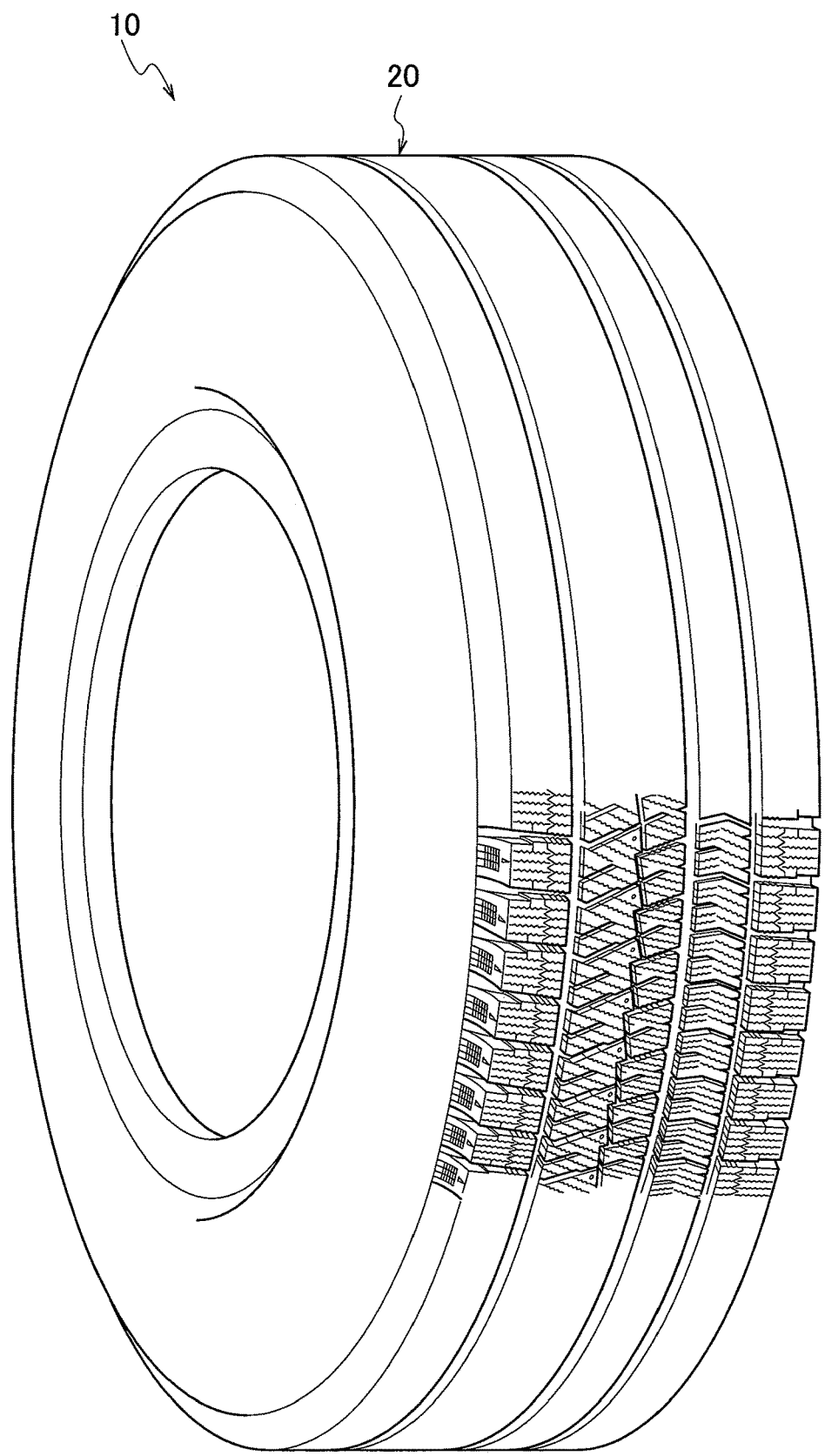
FIG. 1 is a schematic perspective view of a whole of a pneumatic tire 10.

Next, embodiments will be described with reference to the drawings. Further, the same or similar reference numerals are used to designate the same or similar parts, and the description thereof is omitted as needed.

(1) Schematic Configuration of Whole of Tire

Figure 2:
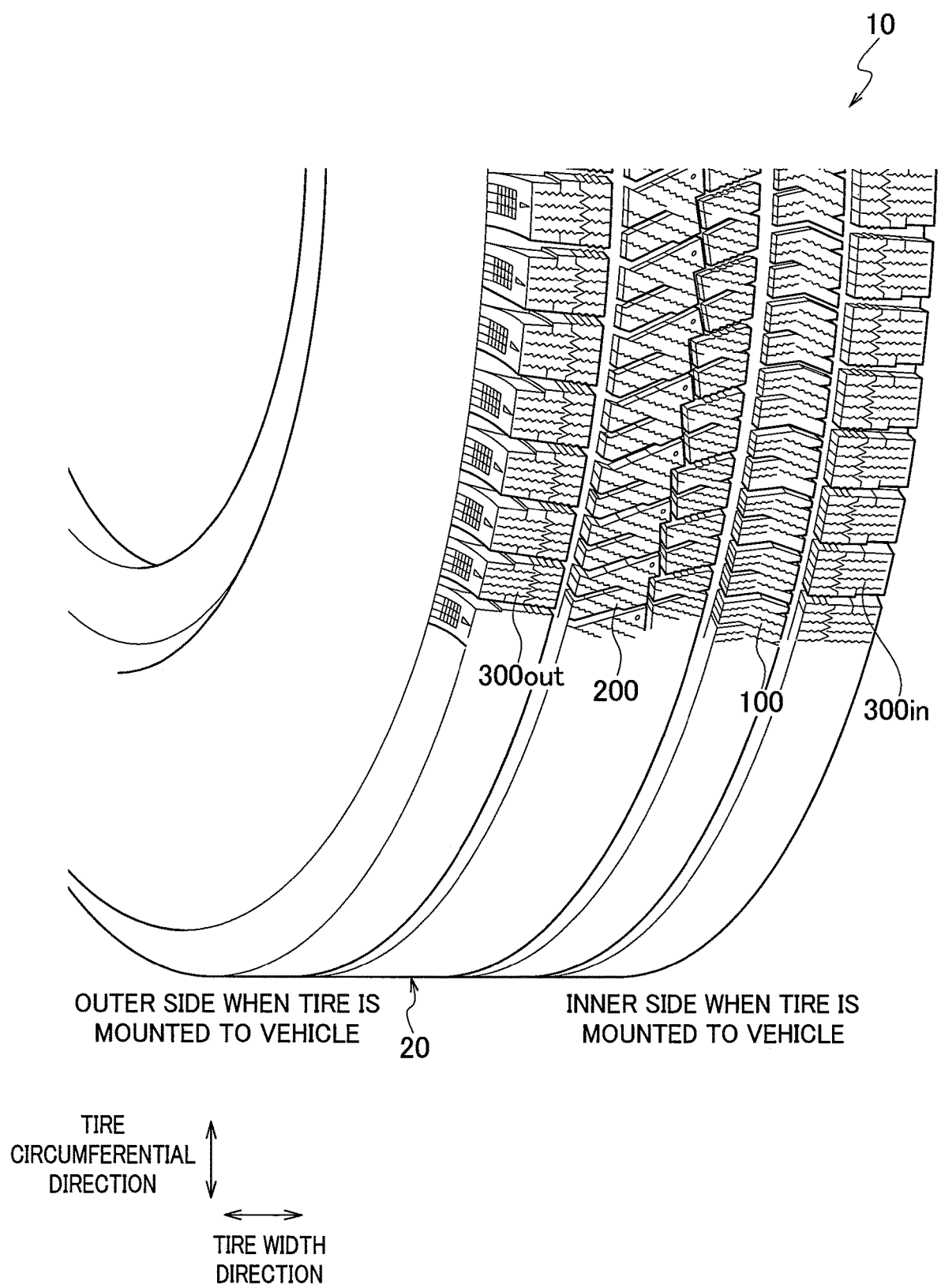
FIG. 2 is an enlarged perspective view of a part of the pneumatic tire 10.
Figure 3:
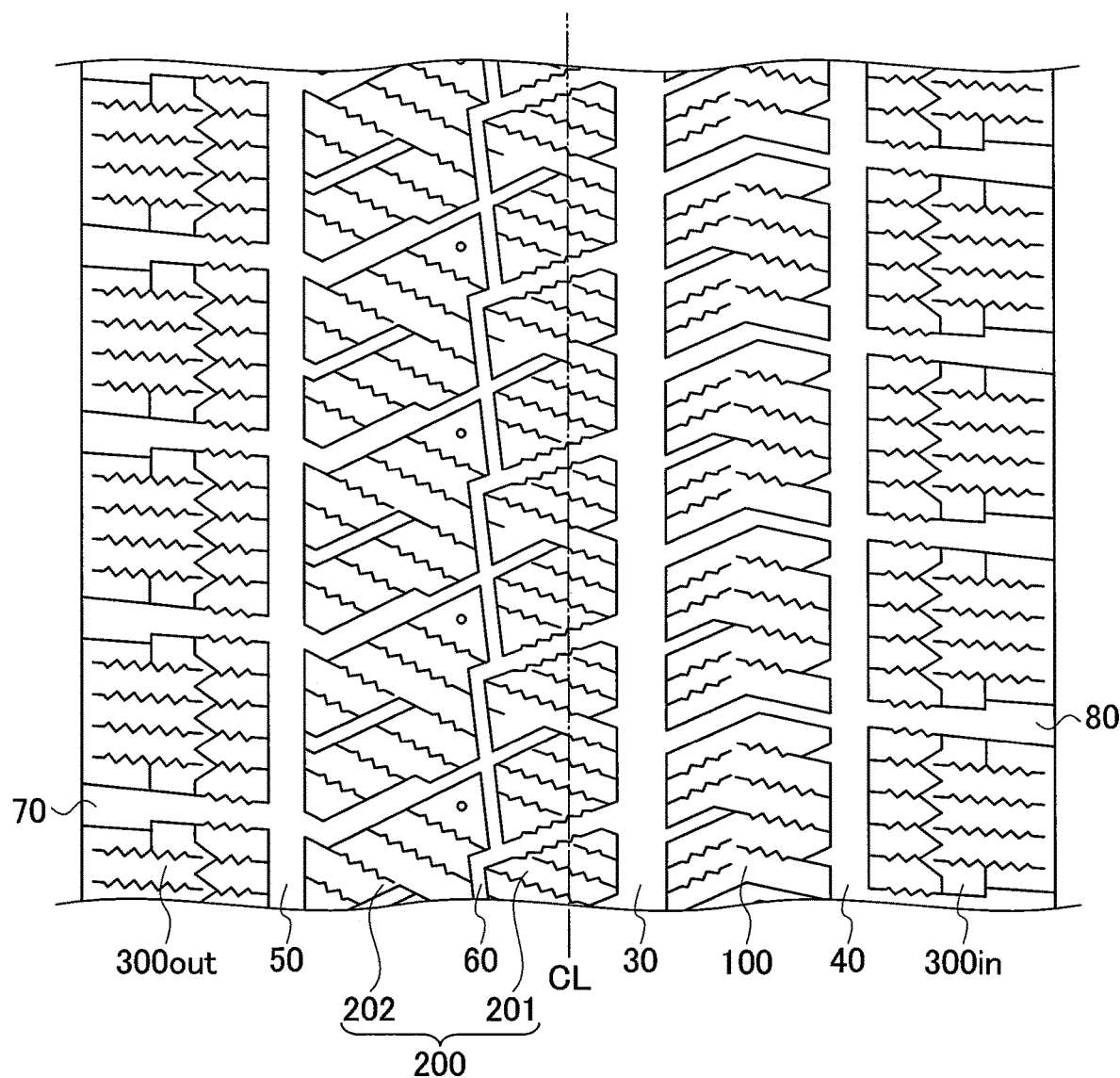
FIG. 3 is a plane developed view of a part of a tread 20.

FIG. 1 is a schematic perspective view of a whole of a pneumatic tire 10 according to the present embodiment. FIG. 2 is an enlarged perspective view of a part of the pneumatic tire 10. Here, in FIG. 1 and FIG. 2, an illustration of a part of a pattern (tread pattern) formed in a tread 20 is omitted. FIG. 3 is a plane developed view of a part of the tread 20.

As shown in FIG. 1 through FIG. 3, the pneumatic tire 10 is formed as a tire so-called studless tire adapted to travel on ice and snow roads, in particular an ice road surface. In the pneumatic tire 10, a rotation direction is not designated, however shoulder land portion rows to be located at an inner side (vehicle hub side) and at an outside when mounted to a vehicle are defined (see FIG. 2).

A plurality of land portion rows contacted with a road surface is formed in the tread 20 of the pneumatic tire 10. Specifically, a V-shape land portion row 100, a center land portion row 200, and shoulder land portion rows 300in, 300out are formed in the tread 20.

The V-shape land portion row 100 is offset from a position of a tire equatorial line CL (not shown in FIG. 1 and FIG. 2, see FIG. 3). Specifically, the V-shape land portion row 100 is arranged at a side of a tread end with respect to the tire equatorial line CL.

The center land portion row 200 is arranged adjacent to the V-shape land portion row 100 and arranged at a position including the tire equatorial line CL.

The shoulder land portion row 300out is arranged adjacent to the center land portion row 200 and arranged at an outer side with respect to the center land portion row 200 when mounted to a vehicle.

The shoulder land portion row 300in is arranged adjacent to the V-shape land portion 100 and arranged at an inner side with respect to the V-shape land portion 100 when mounted to the vehicle.

A plurality of circumferential direction grooves extended in the tire circumferential direction is formed in the tread 20. Specifically, a circumferential direction groove 30 is formed between the V-shape land portion row 100 and the center land portion row 200.

A circumferential direction groove 40 is formed between the V-shape land portion row 100 and the shoulder land portion row 300in. A circumferential direction groove 50 is formed between the center land portion row 200 and the shoulder land portion row 300out.

Further, a circumferential direction groove 60 is formed between a land portion row 201 and a land portion row 202 that form the center land portion row 200.

Further, a lug groove 70 extended in the tire width direction is formed in the shoulder land portion row 300out, and a lug groove 80 extended in the tire width direction is formed in the shoulder land portion row 300in.

Further, an element of the land portion that forms the land portion row and contacts with the road surface is described as a land portion block (alternatively, merely block).

It is preferable that rubber (tread rubber) forming such tread 20 is formed of foamed rubber. The reason that the foamed rubber is preferable is the compression deformation is easily generated due to an effect in which a rubber solid phase part is replaced with an air phase part because an air hole is included in the foamed rubber.

With this, increase of the ground contact area by the flexibility, removal of the water screen that largely decreases a friction coefficient μ on the ice road surface by the holes of foaming on the tread surface, and improvement of the edge effect, which is similar to that caused by the sipe edge component or the block edge component, by the micro edge due to the scratching of the holes of the block foaming are remarkable.

The tread rubber has a structure having two layers or more of a surface rubber and an inner rubber. It is preferable that the foamed rubber is used in the surface rubber, and the inner rubber is formed of non-foamed rubber or formed rubber having elastic modulus larger than that of the surface rubber.

Further, it is preferable that the surface rubber is used in a portion having a depth to a snow platform in a radial direction that indicates a usage limit due to wear, and the inner rubber is used in a portion inner than the snow platform in the radial direction.

The foamed rubber includes air holes therein and has low elastic modulus, the rigidity of a whole of the land portion block (land portion block) is secured by the rigidity of the inner rubber. The foaming ratio is preferably set in a range between 3% and 40%. When the foaming ratio is 40%, the elastic modulus of the foamed rubber is 60% of the elastic modulus of the non-foamed rubber. Thus, in a case in which the foaming ratio is more than 40%, the elastic modulus of the foamed rubber is excessively low, and therefore the rigidity of the whole of the land portion block cannot be secured by any shape of the land portion block.

When the foaming ratio is 3%, the elastic modulus of the foamed rubber is 97% of the elastic modulus of the non-foamed rubber, and therefore the block rigidity can be secured. However, in a case in which the foaming ratio is less than 3%, the flexibility due to the air holes of the foaming, the removal of the water screen, and the edge effect cannot be obtained. More preferably, the foaming ratio is set in a range between 12% and 32%. In this range, securing of the block rigidity, the ground contact area by the flexibility, the removal of the water screen, and the edge effect can be obtained at a high level.

Further, in a winter tire such as a studless tire, the elastic modulus of the tread rubber contacted with the road surface is made low in order for the increase of the friction coefficient μ against the ice road surface and the increase of the ground contact area by the flexibility. However in the non-foamed rubber, in the composition of the non-foamed rubber for the tread rubber, by decreasing an addition amount of carbon, by adopting polymer having low elastic modulus within a usage temperature range, or by lessening a vulcanizing addition amount to suppress cross-linking, the wear performance is deteriorated.

Further, when the tread rubber is made low in the elastic modulus by increasing the oil addition amount, in the produced tire after vulcanizing, the oil is transferred to an outside of the tread rubber, and thereby the elastic modulus becomes high due to aging of a half year through one year. Consequently, the tread rubber is hardened and thereby the flexibility disappears. On the other hand, in the foamed rubber, the flexibility is secured by the air holes therein, and thereby contrary to the oil, foaming holes therein does not disappear due to the aging.

Further, in the composition of the rubber solid phase part other than the rubber, the carbon addition amount can be made large, the elastic modulus of the polymer within the usage temperature range can be made high, and the vulcanizing addition amount can be made large. With this, extremely high elastic modulus of the foamed rubber having excellent wear performance can be obtained without increasing the oil addition amount. Even if the foamed rubber is made high in the elastic modulus, by setting the foaming ratio to 20%, the foamed rubber can be formed as low elastic modulus rubber with 80% of the elastic modulus of the non-foamed rubber, due to the replacement of the air holes.

In the pneumatic tire 10, by using the flexibility and easiness of the compression deformation of the foamed rubber in which the elastic modulus can be made lower against the elastic modulus of the normal non-foamed rubber as the amount of foaming is increased, a shape of the land portion block can be made extremely high in the rigidity.

The elastic modulus of the rubber is set in a range between 2.0 MPa and 5.0 MPa, preferably in a range between 2.3 MPa and 3.5 MPa. The rubber is preferably formed of foamed rubber. The foaming ratio is set in a range between 3% and 40%, preferably in a range between 12% and 32%.

The elastic modulus of the rubber (unit MPa) is a measurement value at a temperature of 23° C. according to Japanese Industrial Standards. The elastic modulus is measured by using a spectrometer produced by Ueshima Seisakusho Co., Ltd. under a condition of initial strain of 2%, dynamic strain of 1%, and frequency of 52 Hz. A dynamic tensile storage elastic modulus E' at a temperature of 23° C. is defined as the elastic modulus.

Large value of the elastic modulus denotes high elasticity.

Here, the measured elastic modulus is the dynamic tensile storage elastic modulus E' in a dynamic tensile viscoelasticity test. However, in other tests such as a dynamic compression viscoelasticity test, a dynamic shear viscoelasticity test and other dynamic viscoelasticity test, the result thereof is similar to the result in the dynamic tensile viscoelasticity test, and therefore as the foaming ratio is larger, lower elasticity is shown.

Accordingly, a configuration of the elastic modulus of the tire described in the present embodiment is satisfied in the dynamic viscoelasticity test under the measurement condition described above or measurement conditions equivalent thereto. The reason is that the tensile elastic modulus, the compression elastic modulus, and the shear elastic modulus of rubber used in the tread portion of the tire are proportional to each other because the Poisson's ratio of rubber is close to 0.5 and a change in volume of the rubber is extremely small when the rubber is deformed.

(2) Configuration of Tread 20

Next, a configuration of the tread 20 will be described. Specifically, each of shapes of the V-shape land portion row 100, the center land portion row 200 and the shoulder land portion row 300out will be described.

(2.1) V-Shape Land Portion Row 100

Figure 4:
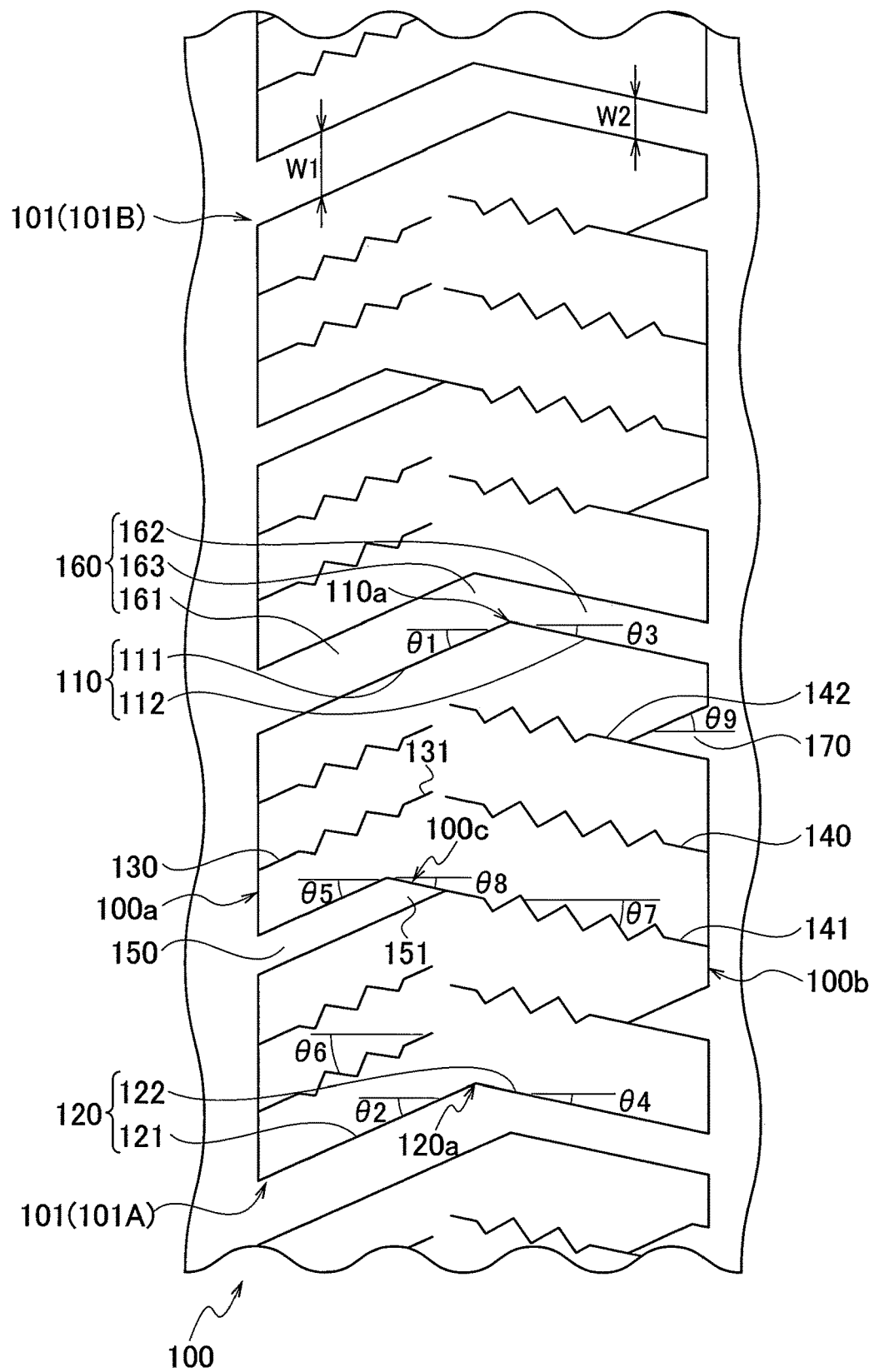
FIG. 4 is an enlarged plane view of a part of a V-shape land portion row 100.

FIG. 4 is an enlarged view of a part of the V-shape land portion row 100. The V-shape land portion row 100 is provided with the land portion block defined by the circumferential direction groove 30, the circumferential direction groove 40, and a width direction inclined groove 160 (lug groove). Specifically, the V-shape land portion row 100 is provided with a plurality of V-shape land portion blocks 101 along the tire circumferential direction.

The V-shape land portion block 101 is provided with a projection portion projected toward one side in the tire circumferential direction, and a recess portion recessed toward the one side in the tire circumferential direction, so that the V-shape land portion block 101 is formed in a V-shape in the tread surface view. Specifically, the V-shape land portion block 101 is formed as a V-shape land portion block having a projection portion 110 and a recess portion 120. Further, the V-shape land portion block 101 denotes a block formed in a V-shape or a chevron-like shape in the tread surface view.

In the tread surface view, an inclined angle $\theta 1$ (inclined direction) of a projection portion side wall 111 of the V-shape land portion block 101 that forms the projection portion 110, against the tire width direction is the same (same direction) as an inclined angle $\theta 2$ of a recess portion side wall 121 that forms the recess portion 120, against the tire width direction. Similarly, an inclined angle $\theta 3$ (inclined direction) of a projection portion side wall 112 of the V-shape land portion block 101, against the tire width direction is the same (same direction) as an inclined angle $\theta 4$ of a recess portion side wall 122 that forms the recess portion 120, against the tire width direction. Here, the inclined angles are not necessarily the same to each other, and "the same" or "the same direction" denotes a case in which the difference between the inclined angles is 20 degree or less (hereinafter, this is similarly applied to the description of the inclined angle).

The inclined angles of the projection portion side wall 111, the sipe 130, and a terminal inclined groove 150 at a side of the tire equatorial line CL, and the inclined angles of the projection portion side wall 112, and the sipe 140 at a side of the tread end are preferably set such that the inclined angles at one side is in a range between 15° and 35°, and the inclined angles at another side is in a range between 7° and 25° against the tire width direction. In the present embodiment, the angles of $\theta 1$, $\theta 2$, $\theta 5$, and $\theta 6$ (one side) shown in FIG. 4 are the same to each other, and the angles of $\theta 3$, $\theta 4$, $\theta 7$, $\theta 8$, and $\theta 9$ (another side) are the same to each other.

By setting the inclined angles of the two side walls located at the side of the projection portion 110 of the V-shape land portion block 101, against the tire width direction to be in such ranges, the edge effect by the block edge and the sipe edge in the tire circumferential direction can be especially enhanced.

A plurality of the sipes inclined against the tire width direction is formed in the V-shape land portion block 101. Specifically, the sipe 130 and the sipe 140 are formed. Each of the sipe 130 and the sipe 140 is inclined against the tire width direction, while the sipe 130 is inclined opposite to the sipe 140 against the tire width direction.

In the present embodiment, each of the sipe 130 and the sipe 140 is formed in a zigzag shape. Specifically, each of the sipe 130 and the sipe 140 is bent against its extending direction (at once or several times) in the tread surface view and formed in a linear shape in the tire radial direction. Or alternatively, each of the sipe 130 and the sipe 140 may be bent in both of its extending direction and the tire radial direction. Or alternatively, each of the sipe 130 and the sipe 140 may be bent in the tire radial direction and formed in a linear shape in its extending direction. Or alternatively, each of the sipe 130 and the sipe 140 may be formed in a linear shape in the tire radial direction and formed in a linear shape in its extending direction. Here, the sipe is a fine groove closed in the ground contact surface of the land portion block. An opening width of the sipe in a ground non-contact state is not especially limited, however the opening width is preferably set in a range between 0.1 mm and 1.5 mm.

Further, a terminal inclined groove inclined against the tire width direction is formed in the V-shape land portion block 101. Specifically, the terminal inclined groove 150 is formed in the V-shape land portion block 101 at a side of the tire equatorial line CL.

Here, to be inclined against the tire width direction denotes that not to be parallel to the tire width direction so as to form a predetermined angle against the tire width direction, and therefore to be inclined against the tire width direction excludes a state to be parallel to the tire circumferential direction (namely, an angle against the tire width direction is 90 degrees).

An inclined angle $\theta 5$ (inclined direction) of the terminal inclined groove 150 against the tire width direction is the same as the inclined angle $\theta 1$ (inclined angle $\theta 2$) of the projection portion side wall 111 against the tire width direction, namely the inclined angles are the same direction. Similarly, an inclined angle of the sipe 130 against the tire width direction is the same (same direction) as the inclined angle θ1 (inclined angle θ2) of the projection portion side wall 111 against the tire width direction. Further, a relation between the recess portion side wall 121 and the sipe 130, a relation between the projection portion side wall 112 and the sipe 140, and a relation between the recess portion side wall 122 and the sipe 140 are similar to the relation described above.

One end of the sipe 130 is opened to a side wall 100a of the V-shape land portion block 101 in the tire width direction. On the other hand, another end of the sipe 130 is terminated in the V-shape land portion block 101. Specifically, an end 131 of the sipe 130 is terminated in the V-shape land portion block 101.

Similarly, one end of the terminal inclined groove 150 is opened to the side wall 100a at a side of the tire equatorial line CL. On the other hand, an end 151 of the terminal inclined groove 150 is terminated in the V-shape land portion block 101.

A circumferential direction length along the tire circumferential direction of the V-shape land portion block 101 is longer than a width direction length along the tire width direction of the V-shape land portion block 101. Here, the circumferential direction length of the V-shape land portion block 101 denotes a length of the longest portion of the V-shape land portion block 101 in the tire circumferential direction, specifically "a circumferential direction length" shown in FIG. 10 described below. The width direction length of the V-shape land portion block 101 denotes a length between the side wall 100a and a side wall 100b, specifically "a width direction length" shown in FIG. 10.

A communication sipe communicated with the terminal inclined groove 150 is included in the sipes 140 formed in the V-shape land portion block 100. Specifically, a communication sipe 141 is included in the sipe 140.

One end of the communication sipe 141, specifically an end 141a, is communicated with an end 151 served as a terminal portion of the terminal inclined groove 150. Another end of the communication sipe 141 is opened to the side wall 100b of the V-shape land portion block 101 in the tire width direction. The side wall 100b is a side wall of the V-shape land portion block 101 at a side of the tread end in the tire width direction.

In the tread surface view, a side wall 100c of the V-shape land portion block 101 that forms the terminal portion (end 151) of the terminal inclined groove 150 is continued to the communication sipe 141 on an extension line of the communication sipe 141. A position of the terminal portion of the terminal inclined groove 150 is different from a position of the most projected portion 110a of the projection portion 110, in the tire width direction.

Further, the terminal inclined groove 150 is extended in the same direction as the sipe 130 formed at a side of an opening end of the terminal inclined groove 150 with respect to most recessed portion 120a of the recess portion 120. The sipe 130 is formed at the side of the opening end of the terminal inclined groove 150 with respect to the most recessed portion 120a. The sipe 140 is formed at a side of a terminal (end 151) of the terminal inclined groove 150 with respect to the most recessed portion 120a.

The most projected portion of the projection portion 110 and the most recessed portion of the recess portion 120 denote the maximum projected point and the maximum recessed point as bent points of the projection portion 110 and the recess portion 120, respectively. In a case in which each of the projection portion 110 and the recess portion 120 is formed in a trapezoidal shape having two bent points, each of the projection portion 110 and the recess portion 120 has a plurality of the bent points, or each of the projection portion 110 and the recess portion 120 is formed in a curved trapezoidal shape having a certain range of the maximum projected point or the maximum recessed point in the tire width direction, the most projected portion of the projection portion 110 and the most recessed portion of the recess portion 120 denote the center positions in the range in the tire width direction.

In the present embodiment, the most projected portion 110a is located at a side of the tread end with respect to the most recessed portion 120a.

A length of the terminal inclined groove 150 is the same as a length of the sipe 130 formed at the side of the opening end of the terminal inclined groove 150. The length of the terminal inclined groove 150 denotes a length of the terminal inclined groove 150 along the extending direction of the terminal inclined groove 150. The length of the sipe 130 denotes a length of the sipe 130 along the extending direction of the sipe 130.

The terminal inclined groove 150 is inclined and extended in the same direction as the sipe 130 formed at a side of the tire equatorial line CL with respect to the center of the V-shape land portion block 101 in the tire width direction.

The V-shape land portion block 101 includes a V-shape land portion block 101A (first block) and a V-shape land portion block 101B (second block) adjacent to each other in the tire circumferential direction. In this way, the V-shape land portion blocks 101 are arranged at a plurality of positions along the tire circumferential direction.

A width direction inclined groove inclined against the tire width direction is formed between the V-shape land portion block 101A and the V-shape land portion block 101B. Specifically, a width direction inclined groove 160 having one bent portion is formed between the V-shape land portion block 101A and the V-shape land portion block 101B.

Specifically, the width direction inclined groove 160 is provided with an inclined groove portion 161 (first inclined groove portion) located at one side in the tire width direction with respect to a bent portion 163, and an inclined groove portion 162 (second inclined groove portion) located at another side in the tire width direction with respect to the bent portion 163. The inclined groove portion 161 is located at a side of the opening end of the terminal inclined groove 150, namely at a side of the tire equatorial line CL with respect to the bent portion 163. The inclined groove portion 162 is located at a side of the terminal (end 151) of the terminal inclined groove 150 with respect to the bent portion 163.

The bent portion 163 is bent at each of a position of the projection portion 110 of the V-shape land portion block 101A and a position of the recess portion 120 of the V-shape land portion block 101B. That is, the bent portion 163 is bent at the positions of the projection portion 110 and the recess portion 120 offset to each other in the tire width direction. Consequently, a circumferential length (groove length) along the tire circumferential direction of the width direction inclined groove 160 is uneven in the tire width direction. Specifically, the circumferential direction length of the inclined groove portion 161 and the circumferential direction length of the inclined groove portion 162 are different from each other, and the circumferential direction length of the inclined groove portion 161 is longer than the circumferential direction length of the inclined groove portion 162.

Further, a linear line between the most projected portion 110a and the most recessed portion 120a is a boundary between the inclined groove portion 161 and the inclined groove portion 162. A total length of a line between a center point in the tire circumferential direction on the boundary and a center point in the tire circumferential direction of the end of the inclined groove portion 161 opposite to the boundary and a line between the boundary and a center point in the tire circumferential direction of the end of the inclined groove portion 162 opposite to the boundary is called width direction length.

The terminal inclined groove 150 is inclined and extended in the same direction as the inclined groove portion 161. The sipe 130 is also extended in the same direction as the inclined groove portion 161. The sipe 140 is extended in the same direction as the inclined groove portion 162.

The V-shape land portion block 101 is arranged in a center region including the tire equatorial line CL or in a second region located at an outer side in the tire width direction of the center region.

In the present embodiment, in the land portion blocks defined by the circumferential grooves and the lug grooves, a land portion block located at a ground contact end is called a shoulder portion land portion block, a land portion block located at an inner side in the tire width direction adjacent to the shoulder portion land portion block is called a second portion land portion block, and a land portion block located at the inner side in the tire width direction adjacent to the second portion land portion block and including the tire equatorial line CL is called a center portion land portion block.

Further, regions included in the center portion land portion block, the second portion land portion block, and the shoulder portion land portion block are called a center region, a second region, and a shoulder region, respectively.

In a case in which the center portion land portion block is formed in one row within the tire width direction, the center region is a region of 16% (W/2×0.16) from the tire equatorial line CL, namely a ground contact center, which is a half of a ground contact width (W) of the pneumatic tire 10, in the tire width direction, and the shoulder region is a region of 42% (W/2×0.42) from a ground contact end, and the second region is a region of 42% (W/2×0.42) of the ground contact width (W) and is located at an inner side in the tire width direction with respect to the shoulder region.

In a case in which the center portion land portion block rows are formed in two rows adjacent to each other in the tire width direction, the center region is a region of 22% (W/2×0.2) from the tire equatorial line CL, namely the ground contact center, which is a half of the ground contact width (W) of the pneumatic tire 10, in the tire width direction, and the shoulder region is a region of 39% (W/2×0.39) from the ground contact end, and the second region is a region of 39% (W/2×0.39) of the ground contact width (W) and is located at the inner side in the tire width direction with respect to the shoulder region.

In a case in which the land portion block is formed across a plurality of regions of the center region, the second region and the shoulder region, the region that occupies the maximum area is defined as the land portion block. For example, in a case in which the center region occupies an area of the land portion block larger than an area of the land portion block occupied by the second region, the land portion block is defined as the center land portion block.

Further, in a case in which determination of the definition position of the center portion land portion block, the second portion land portion block and the shoulder portion land portion block by the circumferential direction grooves is difficult due to a shape of the circumferential direction groove (land portion block) or the like, the land portion block in the center region is defined by a range of the center portion land portion block, the land portion block in the second region is defined by a range of the second portion land portion block, and the land portion block in the shoulder region is defined by a range of the shoulder portion land portion block.

Further, the ground contact width (W) denotes a length in the tire width direction of the tread 20 contacted with a road surface when a normal load is applied to the pneumatic tire 10 filled with air of normal internal pressure. Similarly, the ground contact surface (ground contact area) denotes a part of the tread 20 contacted with the road surface when a normal load is applied to the pneumatic tire 10 filled with air of the normal internal pressure.

The normal internal pressure denotes air pressure corresponding to the maximum load capacity defined in Year Book of JATMA (Japan Automobile Tyre Manufacturers Association). The normal load denotes the maximum load capacity (maximum load) corresponding to the maximum load capacity defined in JATMA Year Book.

A negative ratio of the V-shape land portion block 101 is set in a range between 2.5% and 30%. The negative ratio is preferably set in a range between 2.5% and 12.5%.

The negative ratio of the V-shape land portion block 101 denotes, when an area of the V-shape land portion is defined by an area including the terminal inclined groove 150 and a notched recess portion 170 in the V-shape land portion 101 (hereinafter the same), a ratio of the total area of the terminal inclined groove 150 and the notched recess portion 170 to the area of the V-shape land portion block 101. That is, the negative ratio of a whole of the pneumatic tire 10, and a groove area ratio which is a ratio of the total area of the groove to the ground contact area of the tire including the area of the groove are calculated at one land portion block. Further, the sipe is closed in the ground contact surface, and therefore the area thereof is zero.

Further, a negative ratio of the V-shape land portion row 100 is set in a range between 6% and 36%. The negative ratio is preferably set in a range between 8% and 23%.

The negative ratio of the V-shape land portion row 100 denotes, when an area of the V-shape land portion row 100 between the side walls (side wall 100a and side wall 100b) at both sides in the tire width direction is defined by an area including the terminal inclined groove 150, the notched recess portion 170 and the width direction inclined groove 160 in the V-shape land portion row 100, a ratio of the total area of the terminal inclined groove 150, the notched recess portion 170 and the width direction inclined groove 160 to the area of the V-shape land portion row 100 between the side walls. Further, the sipe is closed in the ground contact surface, and therefore the area thereof is zero.

A ratio of the width direction length of the terminal inclined groove 150 to the width direction length of the V-shape land portion block 101 (see FIG. 10) is set in a range between 24% and 64%. The ratio is preferably set in a range between 34% and 54%. Further, a ratio of the width direction length of the V-shape land portion block 101 to the tread width of the tire is set in a range between 8% and 38%. The ratio is preferably set in a range between 10% and 25%.

A ratio of the circumferential direction length of the terminal inclined groove 150 to the circumferential direction length of the V-shape land portion block 101 (see FIG. 10) is set in a range between 7% and 37%. The ratio is preferably set in a range between 9% and 29%. The circumferential direction length of the terminal inclined groove 150 denotes a length of the terminal inclined groove 150 along the tire circumferential direction (see FIG. 10). Further, the width direction length of the terminal inclined groove 150 denotes a length of the terminal inclined groove 150 along the tire width direction (see FIG. 10). Further, those are similarly applied to other grooves hereinafter.

A ratio of the circumferential direction length of the terminal inclined groove 150 to the width direction length of the terminal inclined groove 150 is set in a range between 2.5% and 20%. The ratio is preferably set in a range between 3% and 10%.

A notched recess portion recessed to notch the V-shape land portion block 101 is formed on the side wall 100b located at an end in the tire width direction of the V-shape land portion block 101. Specifically, the notched recess portion 170 is formed in the V-shape land portion block 101.

A communication sipe (communication sipe 142) communicated with the notched recess portion 170 is included in the sipe 140 formed in the V-shape land portion block 101.

A circumferential direction length along the tire circumferential direction of the notched recess portion 170 (see FIG. 10) becomes longer toward the end of the V-shape land portion block 101, specifically the side wall 100b, in the tire width direction.

In the present embodiment, the notched recess portion 170 is formed as a wedge groove having a wedge shape. However, a shape of the notched recess portion 170 is not limited to the wedge shape (triangle) tapered toward the center of the V-shape land portion block 101 in the tire width direction in the tread surface view. For example, the notched recess portion 170 may be formed in a shape having the edge of the communication sipe 142 not formed in a sharp angle such as a semicircular shape (fan shape), and a rectangular shape having chamfered corners in the tread surface view.

Figure 5:
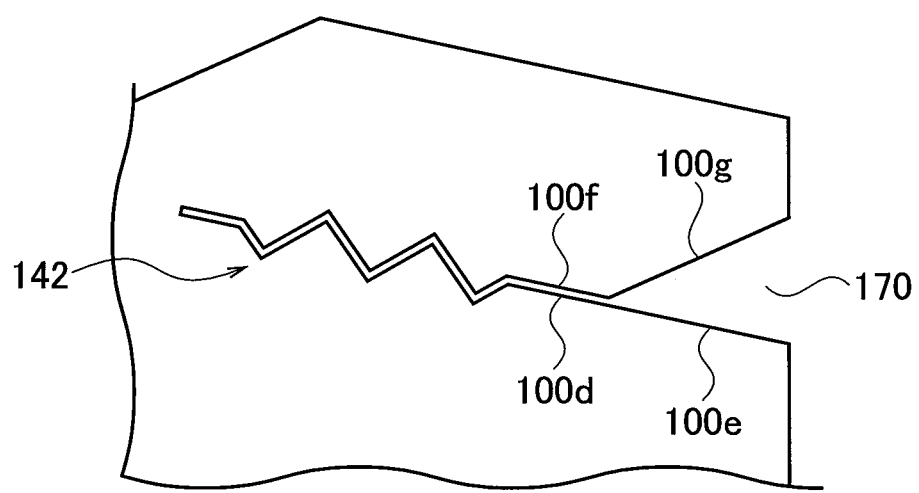
FIG. 5 is an enlarged plane view of a part of a V-shape land portion block 101 forming the V-shape land portion row 100.

FIG. 5 is an enlarged plane view of a part of the V-shape land portion block 101 including the communication sipe 142. As shown in FIG. 5, one side wall (side wall 100d), which forms the communication sipe 142, of the V-shape land portion block 101 is continued to one side wall (side wall 100e), which forms the notched recess portion 170 (wedge groove), of the V-shape land portion block 101. The side wall 100d is extended in the same direction as the communication sipe 142.

Further, another side wall (side wall 100f), which forms the communication sipe 142, of the V-shape land portion block 101 is continued to another side wall (side wall 100g), which forms the wedge groove, of the V-shape land portion block 101. The side wall 100g is extended in an opposite direction to the communication sipe 142 with respect to the tire width direction, namely on the basis of the tire width direction.

A ratio of an area of the notched recess portion 170 to an area of the V-shape land portion block 101 including the area of the notched recess portion 170 is set in a range between 0.3% and 15%. The ratio is preferably set in a range between 0.3% and 7%.

A ratio of the width direction length of the notched recess portion 170 (see FIG. 10) to the width direction length of the V-shape land portion 101 is set in a range between 9% and 38%. The ratio is preferably set in a range between 9.2% and 30%, more preferably a range between 11% and 26%. Further, a ratio of the circumferential direction length of the notched recess portion 170 to the circumferential direction length of the V-shape land portion block 101 is set in a range between 3% and 23%. The ratio is preferably set in a range between 3% and 13%.

Further, a ratio of the width direction length of the notched recess portion 170 to the circumferential direction length of the notched recess portion 170 is set in a range between 130% and 270%. The ratio is preferably set in a range between 150% and 230%.

The notched recess portion 170 is formed in the side wall 100b of the V-shape land portion block 101 at a side of the tread end. The notched recess portion 170 is recessed toward a side of the tire equatorial line CL. The circumferential direction length of the notched recess portion 170 becomes longer toward the tread end.

The V-shape land portion block 101 includes a projection portion side wall 111 (projection portion first side wall) formed at one side in the tire width direction with respect to the most projected portion 110a of the projection portion 110 and inclined against the tire width direction, and a projection portion side wall 112 (projection portion second side wall) formed at another side in the tire width direction with respect to the most projected portion 110a of the projection portion 110 and inclined against the tire width direction.

The sipe 130 formed at one side in the tire width direction, specifically at a side of the tire equatorial line CL is extended in the same direction as the projection portion side wall 111. On the other hand, the sipe 140 formed at another side in the tire width direction, specifically at a side of the tread end is extended in the same direction as the projection portion side wall 112.

The projection portion side wall 111 is longer than the projection portion side wall 112. Specifically, a length along a side wall surface of the projection portion side wall 111 in the tread surface view is longer than a length of a side wall surface of the projection portion side wall 112 in the tread surface view. Further, the sipe 130 is shorter than the sipe 140. Specifically, a length along the extending direction of the sipe 130 (not including amplitude due to the zigzag portion) is shorter than a length along the extending direction of the sipe 140 (not including amplitude due to the zigzag portion).

The V-shape land portion block 101 includes a recess portion side wall 121 (recess portion first side wall) formed at one side in the tire width direction, specifically a side of the tire equatorial line CL, with respect to the most recessed portion 120a and inclined against the tire width direction, and a recess portion side wall 122 (recess portion second side wall) formed at another side in the tire width direction, specifically at a side of the tread end, with respect to the most recessed portion 120a and inclined against the tire width direction.

Further, the projection portion side wall 111 is longer than the recess portion side wall 121. Further, the recess portion side wall 122 is longer than the recess portion side wall 121. Specifically, a length along a side wall surface of the recess portion side wall 122 in the tread surface view is longer than a length along a side wall surface of the recess portion side wall 121 in the tread surface view.

In the present embodiment, an inclined angle (inclined direction) of the projection portion side wall 111 and an inclined angle (inclined direction) of the recess portion side wall 121 are the same (same direction) to each other.

The most projected portion 110a of the V-shape land portion block 101 is offset in the tire width direction from the center in the tire width direction of the V-shape land portion block 101. An offset amount is preferably set in a range between 2.5% and 22.5% of the width direction length of the V-shape land portion block 101.

In a case in which the most projected portion 110a is arranged offset from the center by 2.5% to 22.5% of the width of the V-shape land portion block 101, by setting the circumferential length of the width direction inclined groove 160 at the side of the tread end to be small and by setting the circumferential direction length of the V-shape land portion block 101 to be large, the block rigidity at the side of the tread end is increased. Further, by setting the circumferential direction length of the width direction inclined groove 160 at the side of the tire equatorial line CL to be large and by setting the circumferential direction length of the V-shape land portion block 101 to be small, the block rigidity is decreased, and thereby the V-shape land portion block 101 is appropriately fallen at the side of the tire equatorial line CL rather than the at the side of the tread end, and the edge effect by the block edge and the sipe edge is improved at the side of the tire equatorial line CL. With this, the block rigidity of the V-shape land portion block 101 is balanced well, and both of the on-ice performance and the wear resistant performance are derived.

A circumferential length W1 along the tire circumferential direction of the inclined groove portion 161 located at one side in the tire width direction with respect to the bent portion 163 is longer than a circumferential direction length W2 along the tire circumferential direction of the inclined groove portion 162 located at another side in the tire width direction with respect to the bent portion 163. The circumferential direction length W1 and the circumferential direction length W2 denote, similar to the circumferential direction length of other groove portion, a length of the inclined groove portion 161 along the tire circumferential direction and a length of the inclined groove portion 162 along the tire circumferential direction, respectively.

The sipe 130 formed at one side in the tire width direction, specifically at a side of the tire equatorial line CL, with respect to the bent portion 163 is extended in the same direction as the inclined groove portion 161. On the other hand, the sipe 140 formed at another side in the tire width direction, specifically at a side of the tread end, with respect to the bent portion 163 is extended in the same direction as the inclined groove portion 162.

Further, the sipe 140 includes a sipe wider than the sipe 130 in the tire width direction. Specifically, the sipe 140 and the communication sipe 141 shown in FIG. 4 are wider than the sipe 130 in the tire width direction.

A width direction length, which is a length of the inclined groove portion 161 in the tire width direction, is longer than a width direction length of the inclined groove portion 162. Further, the end 131 of the sipe 130 is terminated at a side of the end, specifically at a side of the side wall 110*a* in the tire width direction with respect to the most projected portion 110*a* of the projection portion 110.

The circumferential direction length W1 of the inclined groove portion 161 is set in a range between 1.32 times and 2.17 times as large as the circumferential direction length W2 of the inclined groove portion 162. The length W1 is preferably set in a range between 1.64 times and 1.96 times as large as the length W2.

A ratio of an area of the width direction inclined groove 160 to an area of the V-shape land portion block 101 is set in a range between 10% and 40%. The ratio is preferably set in a range between 12% and 32%. Further, a ratio of an area of the V-shape land portion block 101 to the ground contact area of the pneumatic tire 10 is set in a range between 10% and 31%. The ratio is preferably set in a range between 9% and 12%.

A ratio of the width direction length of the inclined groove portion 161 to a width (length between the side wall 100*a* and the side wall 100*b*) of the V-shape land portion block 101 in the tire width direction is set in a range between 50% and 78%. The ratio is preferably set in a range between 52% and 68%.

Further, the circumferential direction length of the inclined groove portion 161 is preferably set in a range, for example, between 2.7 mm and 6.1 mm. The circumferential direction length of the inclined groove portion 162 is preferably set in a range, for example, between 1.4 mm and 3.9 mm.

(2.2) Center Land Portion Row 200

Figure 6:
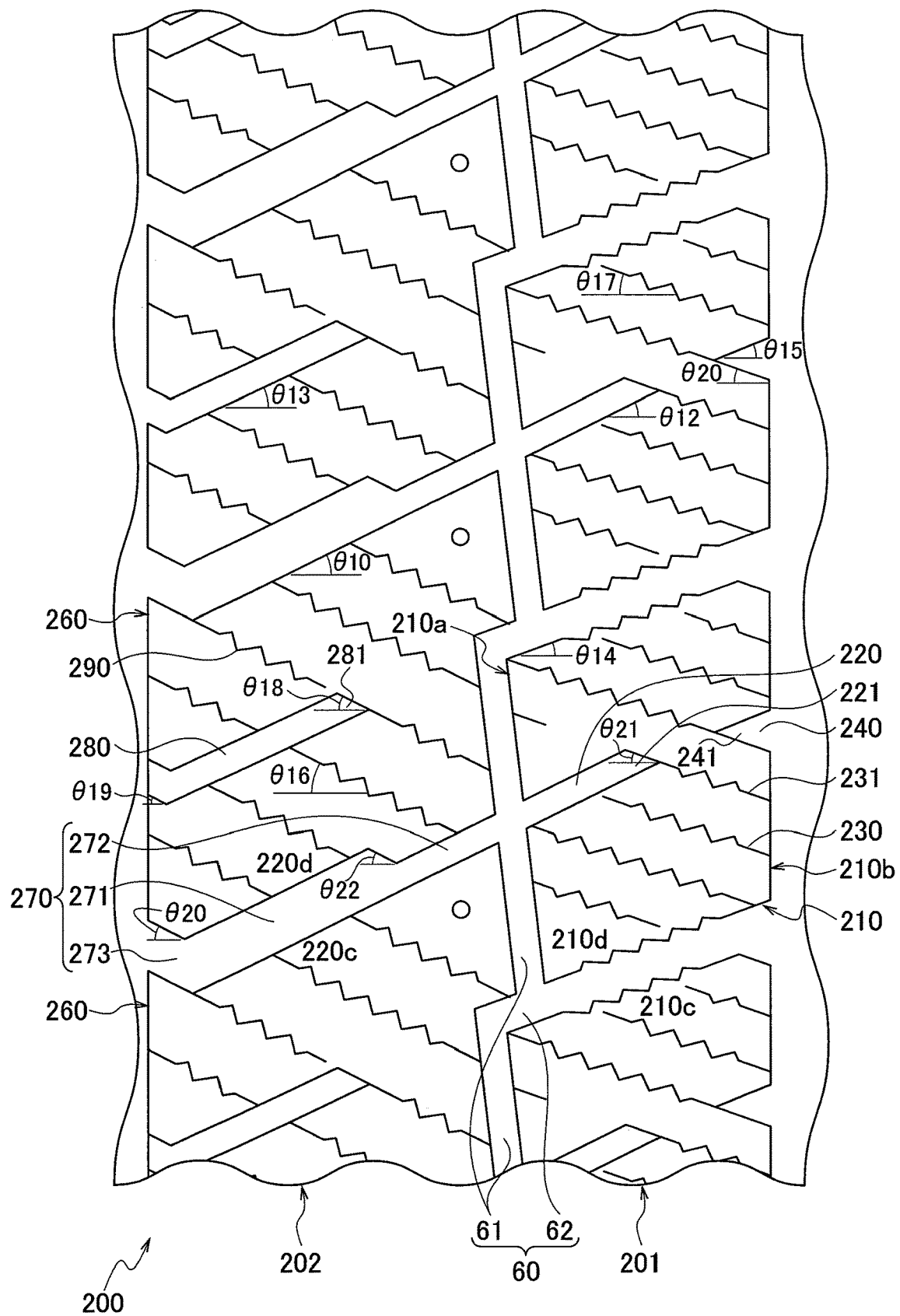
FIG. 6 is an enlarged plane view of a part of a center land portion row 200.

FIG. 6 is an enlarged plane view of a part of the center land portion row 200. The center land portion row 200 is a compound land portion row formed by a land portion row 201 (first land portion row) and a land portion row 202 (second land portion row) arranged along the tire circumferential direction. The land portion row 201 and the land portion row 202 are arranged adjacent to each other in the tire width direction.

In the present embodiment, the land portion row 201 is arranged closer to the tire equatorial line CL than the land portion row 202. Further, at least a part of the center land portion row 200 is formed in the center region including the tire equatorial line CL. Here, the definition of the center region is as described above.

The land portion row 201 is formed by a plurality of land portion blocks 201 (first land portion block) arranged along the tire circumferential direction. Further, the land portion row 202 is formed by a plurality of land portion blocks 260 (second portion land portion block) arranged along the tire circumferential direction.

A terminal inclined groove 220 (first terminal inclined groove) inclined against the tire width direction and opened to a side wall 210*a* at a side of the land portion row 202 is formed in the land portion block 210. Further, a notched groove 240 having a wedge shape opened to a side wall 210*b* opposite to the land portion row 202 is formed in the land portion block 210. Here, the notched groove 240 is not limited to a wedge shape, and therefore the notched groove 240 may be formed in a shape tapered toward a distal end of the notched groove 240.

One end of the terminal inclined groove 220, specifically an end 221, is terminated in the land portion block 210. Further, a distal end 241 of the notched groove 240 is also terminated in the land portion block 210.

A crossing inclined groove is formed between the land portion blocks 260 adjacent to each other to separate the land portion blocks 260. Specifically, a crossing inclined groove 270 is formed between the land portion blocks 260 adjacent to each other.

The crossing inclined groove 270 is inclined in the same direction as the terminal inclined groove 220. That is, an extending direction of the crossing inclined groove 270 and an extending direction of the terminal inclined groove 220 are the same direction in the tread surface view.

A plurality of sipes 230 inclined against the tire width direction to extend in a direction different from the extending direction of the crossing inclined groove 270 is formed in the land portion block 210. A plurality of sipes 290 inclined against the tire width direction to extend in a direction different from the extending direction of the crossing inclined groove 270 is formed in the land portion block 260. In the present embodiment, each of the sipe 230 and the sipe 290 is formed in a zigzag shape in the tread surface view.

The terminal inclined groove 220 and the notched groove 240 are located on an extension line of the crossing inclined groove 270.

A terminal inclined groove 280 (second terminal inclined groove) inclined in the same direction as the terminal inclined groove 220 and opened to a side wall opposite to the first land portion row is formed in the land portion block 260. One end of the terminal inclined groove 280, specifically an end 281, is terminated in the land portion block 260.

A communication sipe 231 communicated with the terminal inclined groove 220 is included in the sipe 230. One end of the communication sipe 231 is communicated with a terminal portion (end 221) of the terminal inclined groove 220. On the other hand, another end of the communication sipe 231 is opened to a side wall 210b opposite to the land portion row 202.

The terminal inclined groove 220 and the crossing inclined groove 270 are inclined in opposite directions to the sipe 230 and the sipe 290 against the tire width direction, respectively.

The crossing inclined groove 270 is provided with a first groove width portion 271 (first groove portion) having a circumferential length (groove width) as same as that of the terminal inclined groove 220, and a second groove width portion 272 (second groove portion) having a circumferential length (groove width) larger than that of the first groove width portion 271. The first groove width portion 271 is formed at a side of the land portion block 210.

Further, a hook-shaped groove is formed at an end of the crossing inclined groove 270 opposite to the land portion row 201. Specifically, a hook-shaped groove portion 273 is formed at the end of the crossing inclined groove 270. The hook-shaped groove portion 273 is inclined in the same direction as the sipe 290 and inclined in an opposite direction to the terminal inclined groove 280 on the basis of the tire width direction. The hook-shaped groove portion 273 is communicated with the second groove width portion 272.

Further, a circumferential direction groove 60 (in-row circumferential direction groove) extended in the tire circumferential direction is formed between the land portion row 201 and the land portion row 202. The circumferential direction groove 60 is not extended in a linear manner in the tire circumferential direction. The circumferential direction groove 60 is provided with a circumferential direction groove portion and an inclined lug groove portion.

Specifically, the circumferential direction groove 60 is provided with a circumferential direction groove portion 61 extended in the tire circumferential direction and inclined against the tire circumferential direction, and an inclined lug groove portion 62 communicated with the circumferential direction groove portion 61 adjacent to the inclined lug groove portion 62 in the tire circumferential direction. The inclined lug groove portion 62 is extended in the tire width direction and inclined in the same direction as the terminal inclined groove 220 against the tire width direction.

Side walls located at ends in the tire circumferential direction of the land portion block 210, specifically side walls 210c, 210d are inclined against the tire width direction. Similarly, side walls located at ends in the tire circumferential direction of the land portion block 260, specifically side walls 220c, 220d are also inclined against the tire width direction.

Further, the side walls are inclined in the opposite direction to the sipe 230 and the sipe 290 against the tire width direction, namely on the basis of the tire width direction. Further, an inclined angle of each of the sipe 230 and the sipe 290 against the tire width direction is larger than an inclined angle of the side wall (side walls 210c, 210d, 220c, 220d) against the tire width direction.

Specifically, the inclined angle of each of the sipe 230 and the sipe 290 is set in a range between 9 degrees and 39 degrees. The inclined angle is preferably set in a range between 12 degrees and 24 degrees. Further, the inclined angle of the side wall (side walls 210c, 210d, 220c, 220d) is set in a range between 6 degrees and 36 degrees. The inclined angle is preferably set in a range between 11 degrees and 31 degrees.

An extending direction of the crossing inclined groove 270 is inclined in a different direction to the sipe 230 and the sipe 290 against the tire width direction. Specifically, in the tread surface view, the extending direction of the extension line of the crossing inclined groove 270 is inclined upward to the right. On the other hand, the extending direction of each of the sipe 230 and the sipe 290 is inclined upward to the left.

As a groove total area S1 is defined by a total area of the terminal inclined groove 220, the terminal inclined groove 280 and the crossing inclined groove 270 in the ground contact surface of the pneumatic tire 10 with the road surface, and a compound land portion row total area S2 is defined by a total area of the land portion and the groove portion between one end in the tire width direction of the center land portion row 200 and another end in the tire width direction of the center land portion row 200, a ratio S1/S2 is set in a range between 0.05 and 0.25. Further, the value of S1/S2 is preferably set in a range between 0.05 and 0.15.

Further, an interval in the circumferential direction of the sipes 230 adjacent to each other in the land portion block 210 is set in a range between 3.3 mm and 10.0 mm. The sipe interval is preferably set in a range between 3.7 mm and 5.6 mm. Further, an interval in the circumferential direction of the sipes 290 adjacent to each other in the land portion block 260 is set in a range between 4.4 mm and 10.0 mm. The sipe interval is preferably set in a range between 5.5 mm and 8.3 mm.

Figure 11:
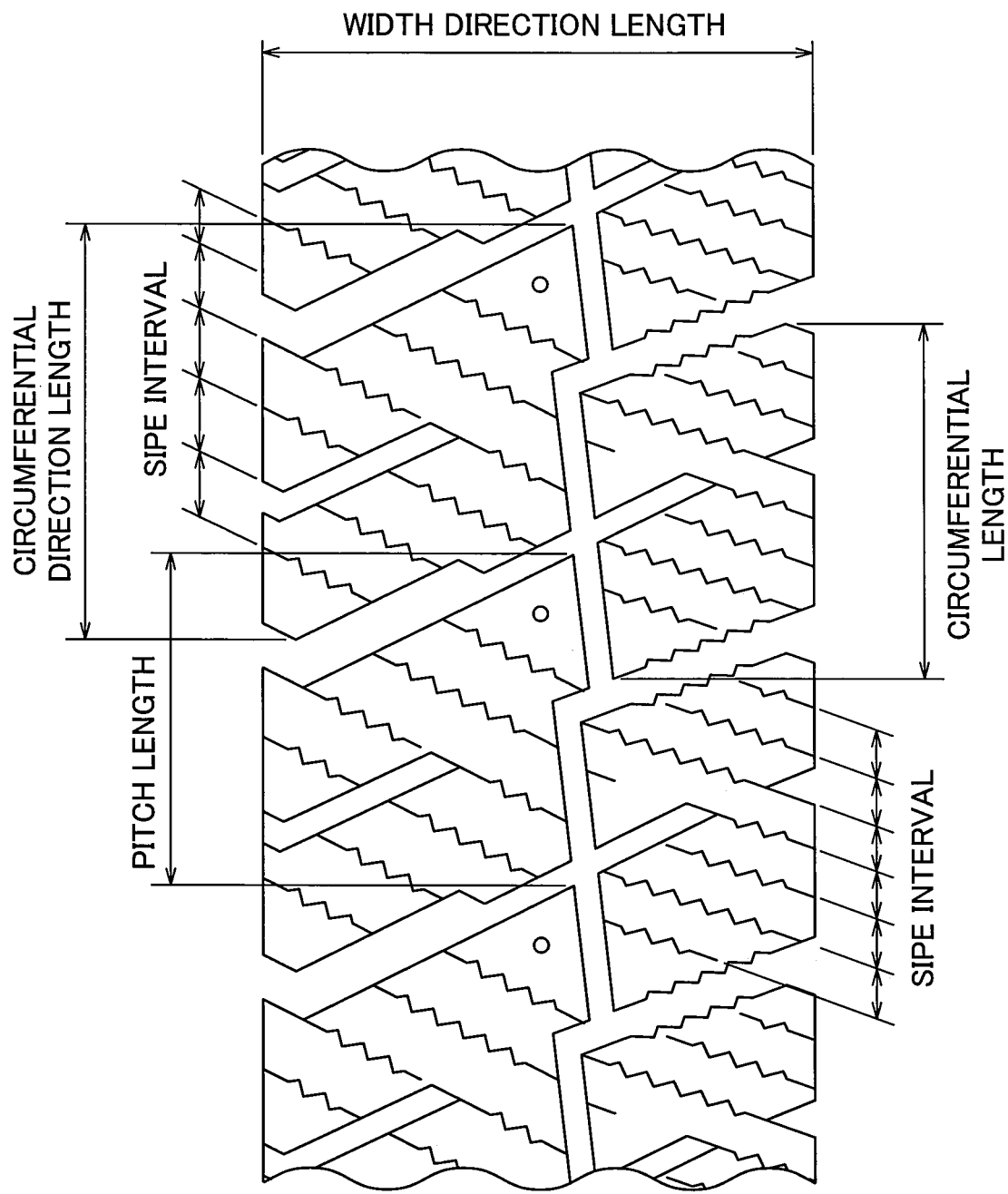
FIG. 11 is a view illustrating definitions of respective lengths in the center land portion row 200.

The interval in the circumferential direction of the sipes 230 denotes "sipe interval" shown in FIG. 11, which is an interval (length) between the sipes 230 adjacent to each other and intersected with a straight line parallel to the tire circumferential direction.

A negative ratio of the land portion block 210 is set in a range between 8.9% and 20.7%. The negative ratio is preferably set in a range between 11.8% and 17.8%. Further, a negative ratio of the land portion block 260 is set in a range between 11.8% and 27.4%. The negative ratio is preferably set in a range between 15.7% and 23.5%.

Further, an average negative ratio of the land portion block 210 and the land portion block 260 adjacent to the land portion block 210 is set in a range between 13.2% and 30.8%. The negative ratio is preferably set in a range between 17.6% and 26.4%.

The negative ratio of the land portion block 210 denotes a ratio (percentage) of the total area of the terminal inclined groove 220 and the notched groove 240 to the total area of the land portion (not including the sipe closed when in the ground contact) of the land portion block 210, and the terminal inclined groove 220 and the notched groove 240 formed in the land portion block 210. Further, the negative ratio of the land portion block 260 denotes a ratio of an area of the terminal inclined groove 280 to the total area of the land portion (not including the sipe closed when in the ground contact) of the land portion block 260, and the terminal inclined groove 280 formed in the land portion block 260.

In the present embodiment, the inclined angle of the sipe 290 against the tire width direction, and the inclined angles of the terminal inclined groove 220, the second terminal inclined groove and the crossing inclined groove 270 against the tire width direction are larger than the inclined angle of the sipe 230 and the inclined angle of the terminal inclined groove 220 against the tire width direction in the land portion block 210.

Further, the terminal inclined groove 220, the second terminal inclined groove and the crossing inclined groove 270 are inclined against the tire width direction in an opposite direction to the sipe 230 and the sipe 290.

Figure 7A:
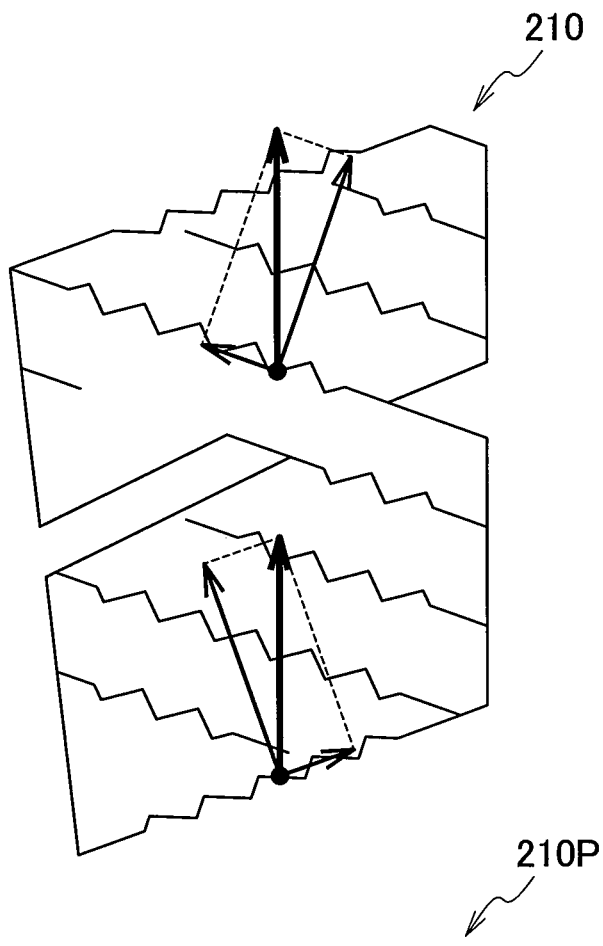
FIG. 7A is a view for describing rotation moment generated in a land portion block 210.
Figure 7B:
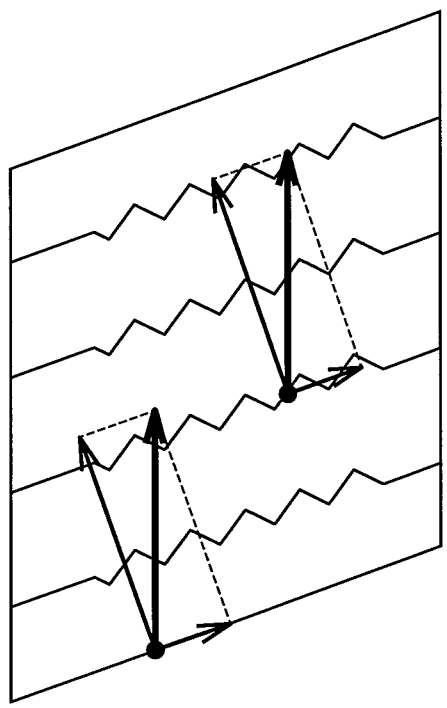
FIG. 7B is a view for describing rotation moment generated in a land portion block 210P in a conventional configuration.

FIGS. 7A and 7B are a view for describing rotation moment generated in the land portion block 210, and a view for describing rotation moment generated in the land portion block 210P in a conventional configuration, respectively.

As shown in FIGS. 7A and 7B, force in a vector direction along the side wall of the tire circumferential direction end is not for rotating the land portion block 210 and the land portion block 210P, however input in a vector direction perpendicular to the side wall of the tire circumferential direction end generates moment to rotate the land portion blocks (counterclockwise direction in FIGS. 7A and 7B).

In the land portion block 210, when the input in the tire circumferential direction is applied, the rotation moment generated at a side wall position of the tire circumferential direction end of the land portion block 210 and the rotation moment generated at a position of the sipe 230 are opposite direction to each other, and therefore the rotation moments are cancelled to each other, so that the deformation of the land portion block 210 is suppressed.

(2.3) Shoulder Land Portion Row 300in and Shoulder Land Portion Row 300out

Figure 8:
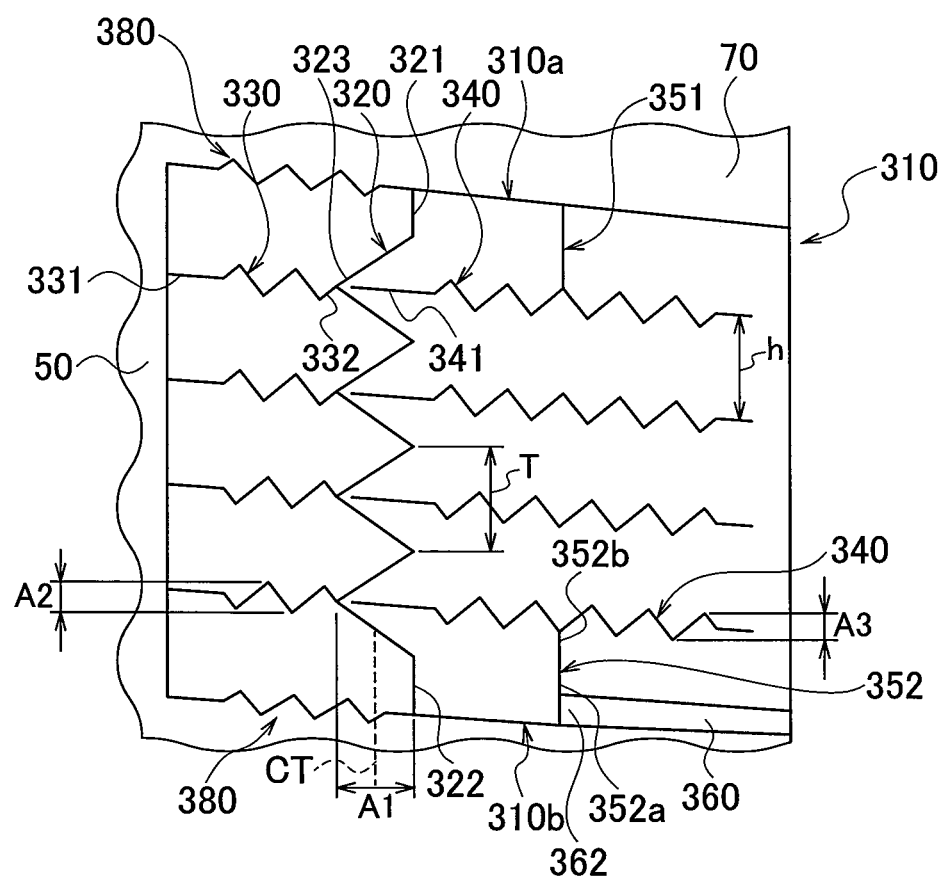
FIG. 8 is an enlarged plane view of a part of a shoulder land portion row 300in.
Figure 9:
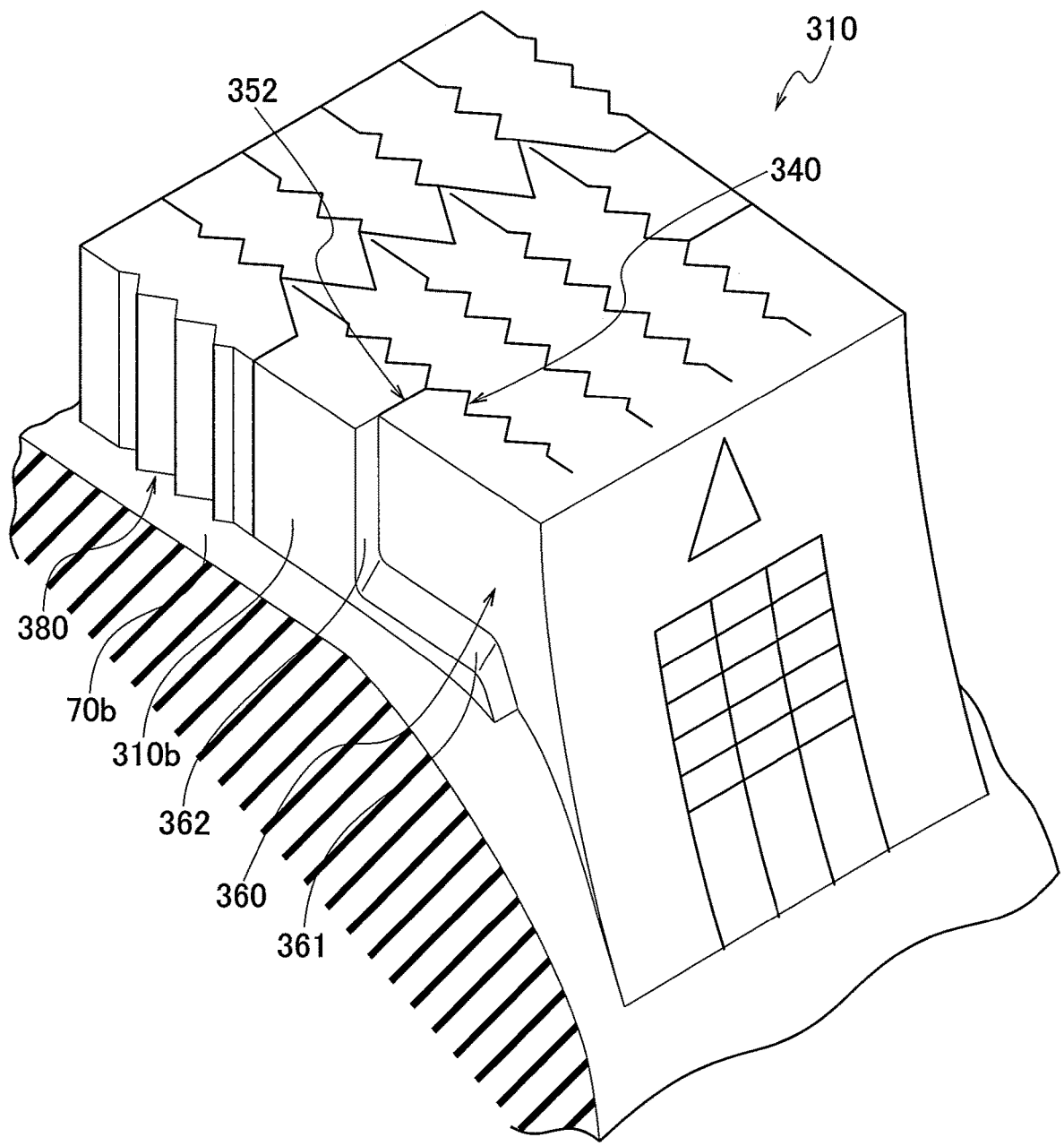
FIG. 9 is an enlarged perspective view of a land portion block 310 forming the shoulder land portion row 300in.

FIG. 8 is an enlarged plane view of a part of the shoulder land portion row 300in. FIG. 9 is an enlarged perspective view of a land portion block 310 that forms the land portion block 310in.

The shoulder land portion row 300in and the shoulder land portion row 300out are formed symmetry with respect to the tire equatorial line CL. Hereinafter, a shape of the shoulder land portion row 300in will be described.

The land portion block 310 that forms the shoulder land portion row 300in is formed as a land portion block defined by the circumferential direction groove 50 and the lug groove 70. In the present embodiment, the land portion block 310 is formed at a tread end including a ground contact end with the road surface in the tire width direction.

A circumferential direction sipe 320 having a zigzag shape extended in the tire circumferential direction, a width direction sipe 330 (equatorial side width direction sipe) having a zigzag shape extended in the tire width direction, and a width direction sipe 340 (tread end side width direction sipe) are formed in the land portion block 310.

The width direction sipe 330 is located at a side of the tire equatorial line CL with respect to the circumferential direction sipe 320. The width direction sipe 340 is located at a side of the tread end in the tire width direction with respect to the circumferential direction sipe 320.

The circumferential direction sipe having a zigzag shape extended in the tire circumferential direction denotes a sipe having an extending direction on the tread surface as same as the tire circumferential direction and bent in a zigzag shape in the extending direction. A width direction sipe having a zigzag shape extended in the tire width direction denotes a sipe having an extending direction on the tread surface as same as the tire width direction and bent in a zigzag shape in the extending direction.

In the land portion block 310, a ratio L1/L2 of a total amount L1 of a width direction edge component, which is an edge component in the tire width direction of the circumferential direction sipe 320, to a total amount L2 of a circumferential direction edge component, which is an edge component in the tire circumferential direction of the width direction sipe 320 and the width direction sipe 340, is set in a range between 16.0% and 37.4%. The ratio L1/L2 is preferably set in a range between 21.4% and 32.0%.

Here, the edge component derives an edge effect that works in a orthogonal direction to an input direction from the road surface to the groove or the sipe of the pneumatic tire 10, when the pneumatic tire 10 scratches the road surface by the groove or the sipe. The edge component denotes a size (length) of the groove or the sipe in an orthogonal direction to the input direction from the road surface.

The edge component of one width direction sipe in the land portion block denotes a length of the sipe projected on a straight line inclined against the tire equatorial line CL by 90 degrees, namely a straight line parallel to the tire width direction, regardless of the width direction sipe linearly extended on the tread surface, or the width direction sipe having amplitude such as a zigzag wave.

Further, the edge component denotes a so-called circumferential direction edge component along the tire width direction of the land portion block in which force is applied in the tire circumferential direction unless otherwise mentioned as described above. The edge component includes a block edge component of the edge of the block, a sipe edge component of the edge of the sipe and the like.

Further, a ratio (L1+L2)/L3 of a sum of the total amount L1 and the total amount L2 to an average length L3 in the tire circumferential direction of the land portion block 310 is set in a range between 3.4 and 7.8. The ratio is preferably set in a range between 3.9 and 5.9. In a case in which a plurality of the circumferential direction lengths of the land portion blocks 310 formed along the tire circumferential direction exists, namely in a case in which the shoulder land portion row 300in has a plurality of pitches, the average length L3 denotes an average of the circumferential direction lengths of the land portion blocks 310.

In the present embodiment, a repeating period T of the zigzag shape of the circumferential direction sipe 320 is equal to an interval h of the width direction sipes 340 adjacent to each other in the tire circumferential direction. Further, the period T may be smaller than the interval h.

Further, width direction amplitude (amplitude A1), which is the amplitude in the tire width direction of the circumferential direction sipe 320, is larger than circumferential amplitude (amplitude A2, A3), which is the amplitude in the tire circumferential direction of the width direction sipe 340.

A circumferential direction sub sipe extended in the tire circumferential direction is formed in the land portion block 310. Specifically, a circumferential direction linear sipe 351 having a linear shape, and a circumferential direction linear sipe 352 having a linear shape are formed in the land portion block 310. Here, the circumferential direction sub sipe may not be formed in a linear shape such as the circumferential direction linear sipe 351 and the circumferential direction linear sipe 352, and therefore the circumferential direction sub sipe may include one bent portion having a small bent angle.

One ends of the circumferential direction linear sipe 351 and the circumferential direction linear sipe 352 are communicated with the width direction sipe 340. On the other hand, another ends of the circumferential direction linear sipe 351 and the circumferential direction linear sipe 352 are opened to the side walls 310a, 310b located at a side of the tire circumferential direction end of the land portion block 310, respectively.

The circumferential direction sipe 320 includes a linear portion linearly extended to be parallel to the tire circumferential direction. Specifically, the circumferential direction sipe 320 includes a linear portion 321 and a linear portion 322.

The linear portion 321 and the linear portion 322 are formed at the end of the land portion block 310 in the tire circumferential direction. Specifically, the linear portion 321 is formed at a side of the side wall 310a at the tire circumferential end of the land portion block 310, and the linear portion 322 is formed at a side of the side wall 310b.

Each of the linear portion 321 and the linear portion 322 is formed at a position offset from a center position CT of the amplitude A1 in the tire width direction of the circumferential direction sipe 320. That is, each of the linear portion 321 and the linear portion 322 is formed at a position shifted from the center position CT in the tire width direction.

An end 332 at a side of the tread end of the width direction sipe 330 is communicated with the circumferential direction sipe 320. On the other hand, an end 341 at a side of the tire equatorial line CL of the width direction sipe 340 is not communicated with the circumferential direction sipe 320 but terminated in the land portion block 310 at a side of the tread end with respect to the circumferential direction sipe 320.

Further, an end 331 at a side of the tire equatorial line CL of the width direction sipe 330 is communicated with the circumferential direction groove adjacent to the land portion block 310, specifically the circumferential direction groove 50 formed at a side of the tire equatorial line CL. On the other hand, an end 341 at a side of the tread end of the width direction sipe 340 is terminated in the land portion block 310.

Further, an end 332 at a side of the tread end of the width direction sipe 330 is communicated with an apex 323 of the circumferential direction sipe 320 having a zigzag shape. The width direction sipe 340 is located on an extension line of the width direction sipe 330 communicated with the apex 323 of the circumferential direction sipe 320 having a zigzag shape.

The circumferential direction sipe 320 has predetermined amplitude (amplitude A1) in the tire width direction. The end 341 of the width direction sipe 340 is located in a range of the amplitude A1.

A notched step portion notching the land portion block 310 is formed in the side wall 310b located at a side of the tire circumferential direction end of the land portion block 310. Specifically, a step portion 360 is formed at the end of the land portion block 310 at the side of the tread end in the tire width direction.

The step portion 360 is formed only in one side wall of the land portion block 310 at the side of the tire circumferential direction end, specifically only in the side wall 310b.

As shown in FIG. 9, the step portion 360 is provided with a raised bottom surface located at an outer side in the tire radial direction with respect to a groove bottom 70b of the lug groove 70. Specifically, the step portion 360 is provided with a raised bottom surface 361 having a rectangular shape extended in the tire width direction.

In the present embodiment, the raised bottom surface 361 is inclined against the tire radial direction in a tire side view. A position in the tire radial direction of the raised bottom surface 361 is not especially limited, however the position is preferably set in a range between 25% and 50% of a height (length in the tire radial direction) of the land portion block 310 from a viewpoint of securing the block rigidity of the land portion block 310.

One end of the circumferential direction linear sipe 352, specifically an end 352a at a side of the side wall 310b is opened to the side wall 310b of the tire circumferential direction end at a side of the step portion 360 of the land portion block 310. That is, the end 352a is opened to an end 362 at a side of the tire equatorial line CL of the step portion 360. On the other hand, another end of the circumferential direction linear sipe 352, specifically an end 352b at a side of the width direction sipe 340 is communicated with the width direction sipe 340.

The raised bottom surface 361 is inclined such that the height in the tire radial direction becomes lower toward the tire circumferential end of the land portion 310, namely the side wall 310b.

A zigzag surface having predetermined amplitude in the tire circumferential direction is formed in the side wall at a side of the tire circumferential direction end of the land portion 310. Specifically, a zigzag surface 380 is formed in each of the side wall 310a and the side wall 310b. The zigzag surface 380 is formed at the end at a side of the tire equatorial line CL of each of the side wall 310a and the side wall 310b. A shape of the zigzag surface 380 is the same as the shape of the width direction sipe 340 in the tread surface view.

(3) Relation Between Pitch and Sipe of Land Portion Block in the Pneumatic Tire 10

Next, a relation between a pitch and a sipe in the pneumatic tire 10 will be further described with reference to FIG. 10 through FIG. 13.

Figure 10:
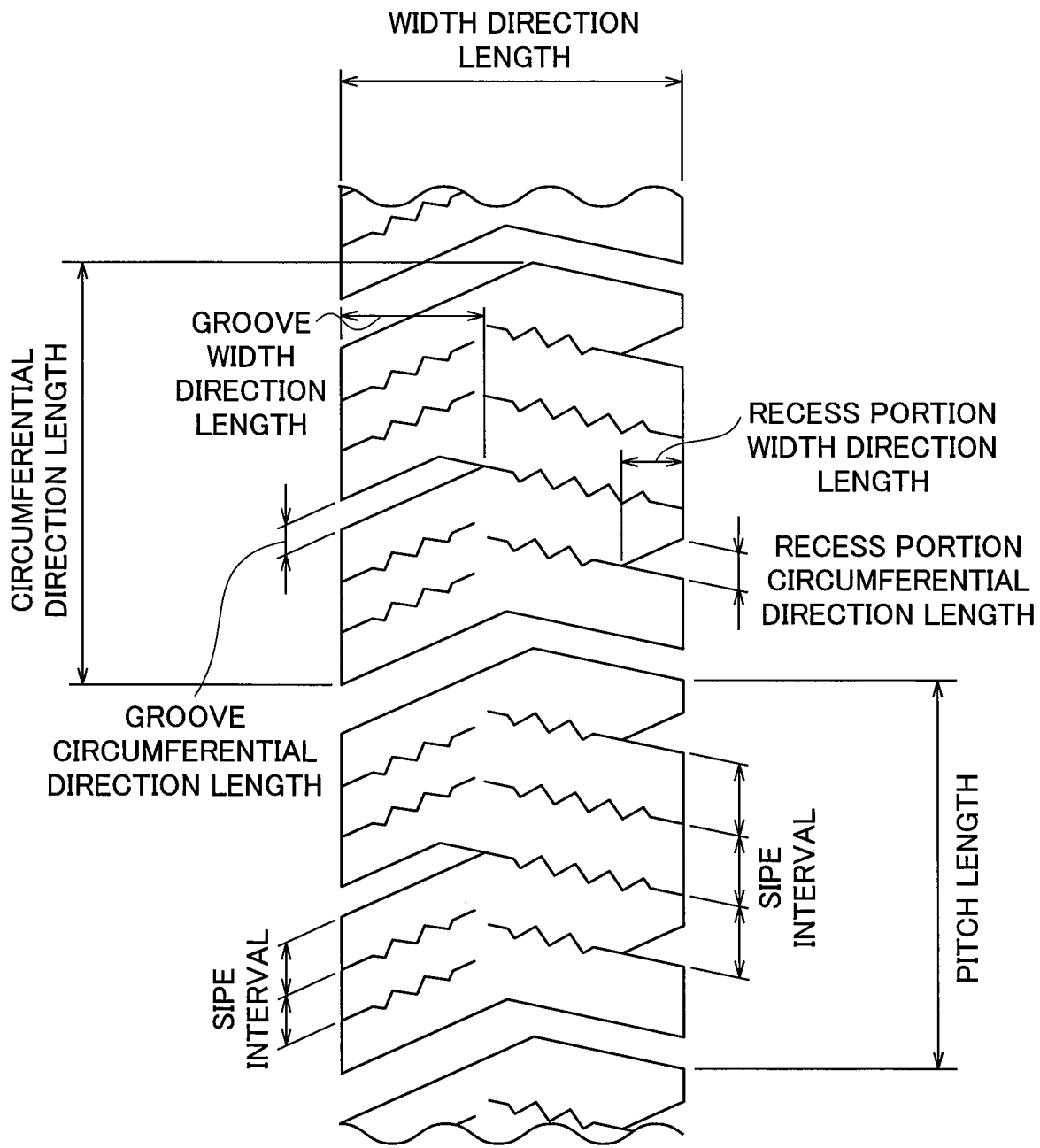
FIG. 10 is a view illustrating definitions of respective lengths in the V-shape land portion row 100.
Figure 12:
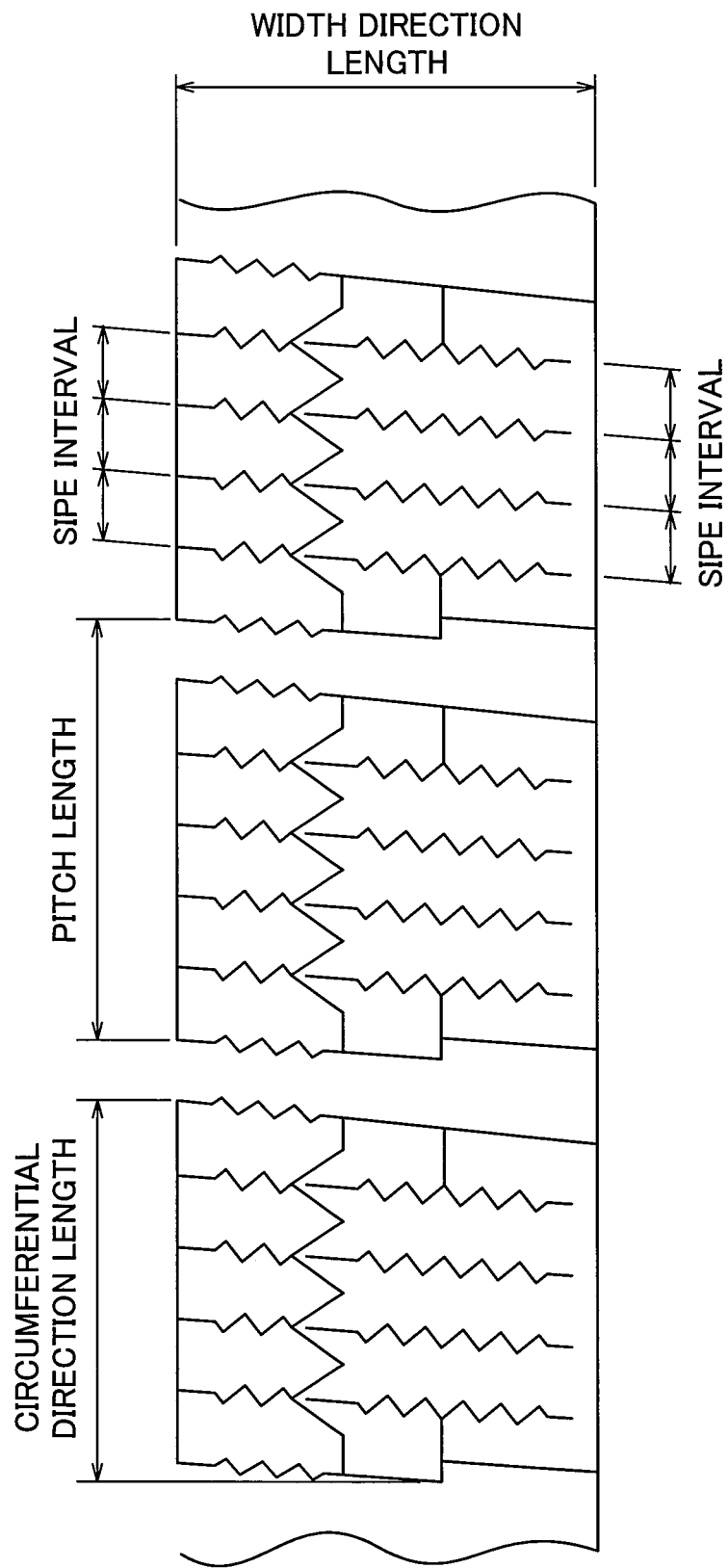
FIG. 12 is a view illustrating definitions of respective lengths in the shoulder land portion row 300in.
Figure 13:
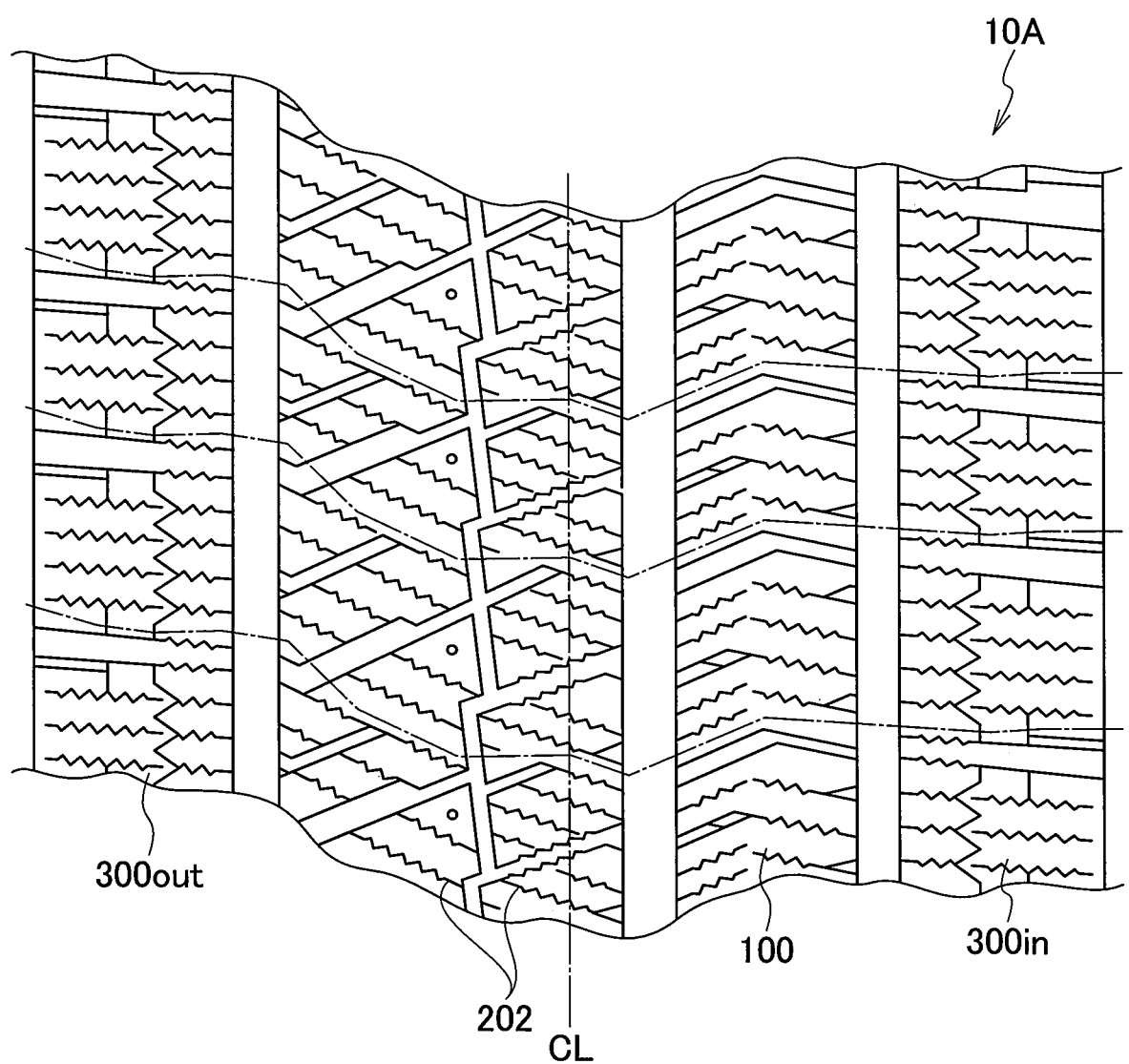
FIG. 13 is a plane developed view of a part of a pneumatic tire 10A having a pitch different from that of the pneumatic tire 10 shown in FIG. 1 through FIG. 12.

FIG. 10 is a view illustrating definitions of respective lengths in the V-shape land portion row 100. FIG. 11 is a view illustrating definitions of respective lengths in the center land portion row 200. FIG. 12 is a view illustrating definitions of respective lengths in the shoulder land portion row 300in. FIG. 13 is a plane developed view of a part of a pneumatic tire 10A having a pitch different from that of the pneumatic tire 10 shown in FIG. 1 through FIG. 12.

As described above, one or more sipes extended in the tire width direction are formed in at least one of the land portion blocks of the pneumatic tire 10 (and the pneumatic tire 10A, hereinafter the same).

As an average sipe interval h is defined by an average interval of the sipes adjacent to each other in the tire circumferential direction and an average pitch length L is defined by an average length of a repeating unit of the land portion blocks in the tire circumferential direction, it is preferable to fulfill the following relation.

$$0.130 \leq (h/L) \leq 0.400$$

Here, the value of (h/L) is more preferably set in a range between 0.137 and 0.197, and further more preferably set in a range between 0.144 and 0.19.

The average sipe interval h (unit mm) denotes an average circumferential direction length of the sipes adjacent to each other in the tire circumferential direction in the land portion block. In a case in which the sipes adjacent to each other do not exist, the average sipe interval h is defined by the circumferential direction length between the tire circumferential direction end of the land portion block and the sipe.

Further, in a case in which the sipe is not formed at all (the number of the sipes is zero), the average sipe interval h is defined by the circumferential direction length between one tire circumferential direction end of the land portion block and another tire circumferential direction end. Normally, the land portion block is divided substantially evenly in the tire circumferential direction by the sipe, however the land portion block may not be divided evenly. Here, the average sipe interval h denotes an average value in all land portion blocks formed in the circumference of the land portion block row unless otherwise mentioned.

Further, the pitch denotes one basic unit of a tread pattern formed by a pattern repeated continuously in the tire circumferential direction at one or more kinds of lengths. The average pitch length L (unit mm) denotes a length of the pitch in the tire circumferential direction. The average pitch length L denotes an average circumferential direction length of the pitches in the land portion block row unless otherwise mentioned.

Further, it is preferable that the average sipe interval h and the average pitch length L fulfill the following relation.

$$140 \text{ (mm)}^2 \leq (h \times L) \leq 350 \text{ (mm)}^2 \text{ (hereinafter, unit (mm)}^2 \text{ is omitted)}$$

Here, the value of (h×L) is more preferably set in a range between 148 and 250, and further more preferably set in a range between 150 and 220.

The average sipe interval h of the center portion land portion block preferably fulfills a relation of 3.0 mm≤h≤7.1 mm. Further, the average sipe interval h of the center portion land portion block more preferably fulfills a relation of 3.5 mm≤h≤6.6 mm, and further more preferably fulfills a relation of 3.7 mm≤h≤5.6 mm.

The average sipe interval h of the second portion land portion block preferably fulfills a relation of 3.3 mm≤h≤7.7 mm. Further, the average sipe interval h of the second portion land portion block more preferably fulfills a relation of 3.8 mm≤h≤7.2, mm and further more preferably fulfills a relation of 4.1 mm≤h≤6.1 mm.

The average sipe interval h of the shoulder portion land portion block preferably fulfills a relation of 3.7 mm≤h≤8.5 mm. Further, the average sipe interval h of the shoulder portion land portion block more preferably fulfills a relation of 4.2 mm≤h≤8.0 mm, and further more preferably fulfills a relation of 4.5 mm≤h≤6.8 mm.

Here, the definitions of the center portion, the second portion and the shoulder portion land portion blocks are as described above.

A plurality of the sipes extended in the tire width direction is formed in the land portion block of the pneumatic tire 10 according to the present embodiment. In this case, the average sipe interval h preferably fulfills a relation of 3.4 mm≤h≤7.9 mm. Further, in this case, the average sipe interval h more preferably fulfills a relation of 3.9 mm≤h≤7.4 mm, and further more preferably fulfills a relation of 4.2 mm≤h≤6.3 mm.

Further, in this case, the average pitch length L preferably fulfills a relation of 19.2 mm≤L≤44.6 mm. Further, the average pitch length L more preferably fulfills a relation of 22.0 mm≤L≤41.6 mm, and further more preferably fulfills a relation of 23.6 mm≤L≤35.4 mm.

Further, as an average block edge component Dball is defined by an average of the edge components of all land portion blocks against the tire circumferential direction, an average sipe edge component Dsall is defined by an average of the edge components of all sipes against the tire circumferential direction, and an average block rigidity G is defined by an average of the rigidity of all land portions, it is preferable to fulfill the following relation.

$$2.20 \text{ (mm)}^3/\text{N} \leq (D\text{ball}/D\text{sall})/G \leq 4.00 \text{ (mm)}^3/\text{N (hereinafter, unit (mm)}^3/\text{N is omitted)}$$

Here, the definition of the edge component is as described above. Further, the block rigidity as a base of the average block rigidity G is a value when the shearing deformation in the tire circumferential direction is applied. Specifically, the block rigidity per unit area is calculated by the following formula.

Shearing stress (N/mm)/Land portion block ground contact area (mm$^2$)

In particular, the measurement using the Amsler testing machine as disclosed in JP 4615983 B is calculated by FEM.

Further, as a value of R is defined by a value of (Dball/Dsall)/G, it is more preferable to fulfill a relation of 2.55≤(R$_2$/Rc)≤3.55, and it is further more preferable to fulfill a relation of 2.80≤(R$_2$/Rc)≤3.20.

As a value of Rc is defined by a value of (Dballc/Dsallc)/Gc of the center portion land portion block and a value of R$_2$ is defined by a value of (Dball$_2$/Dsall$_2$)/G$_2$ of the second portion land portion block, it is preferable to fulfill the following relations.

$$2.20 \leq (D\text{ball}/D\text{sall})/G \leq 4.00$$

$$1.10 \leq (R_2/Rc) \leq 5.88$$

Here, it is more preferable to fulfill a relation of 1.10≤(R$_2$/Rc)≤3.55, and it is further more preferable to fulfill a relation of 1.20≤(R$_2$/Rc)≤1.80.

Further, as a value of R$_2$ is defined by a value of (Dball$_2$/Dsall$_2$)/G$_2$ of the second portion land portion block, and a value of Rs is defined by a value of (Dballs/Dsalls)/Gs of the shoulder portion land portion block, it is preferable to fulfill the following relation.

$$1.10 \leq (Rs/R_2) \leq 2.90$$

Here, it is more preferable to fulfill a relation of 1.10≤(Rs/R$_2$)≤2.35, and it is further more preferable to fulfill a relation of 1.20≤(Rs/R$_2$)≤1.80.

Further, as an average block edge component Dball is defined by an average of the edge components of all land portion blocks against the tire circumferential direction, and an average sipe edge component Dsall is defined by an average of the edge components of all sipes against the tire circumferential direction, it is preferable to fulfill the following relation.

$$0.15 \leq (D\text{ball}/D\text{sall}) \leq 0.48$$

Here, it is more preferable to fulfill a relation of 0.21≤(Dball/Dsall)≤0.31, and it is further more preferable to fulfill a relation of 0.23≤(Dball/Dsall)≤0.29.

Further, as a value of Pc is defined by a value of (Dballc/Dsallc) of the center portion land portion block, and a value of P$_2$ is defined by a value of (Dball$_2$/Dsall$_2$) of the second portion land portion block, it is preferable to fulfill the following relation.

$$1.12 \leq (P_2/Pc) \leq 5.88$$

Here, it is more preferable to fulfill a relation of 1.15≤(P$_2$/Pc)≤4.00, and it is further more preferable to fulfill a relation of 1.17≤(P$_2$/Pc)≤2.50.

Further, as a value of Pc is defined by a value of (Dballc/Dsallc) of the center portion land portion block, a value of P$_2$ is defined by a value of (Dball$_2$/Dsall$_2$) of the second portion land portion block, and a value of Ps is defined by a value of (Dballs/Dsalls) of the shoulder portion land portion block, it is preferable to fulfill the following relation.

$$0.81 \leq \{(Ps/P_2)/(P_2/Pc)\} \leq 3.70$$

Here, it is more preferable to fulfill a relation of $0.94 \leq \{(Ps/P_2)/(P_2/Pc)\} \leq 3.00$, and it is further more preferable to fulfill a relation of $0.96 \leq \{(Ps/P_2)/(P_2/Pc)\} \leq 2.80$.

Further, as a value of hc is defined by an average sipe interval, which is an average interval of the sipes adjacent to each other, in the tire circumferential direction in the center portion land portion block, and a value of $h_2$ is defined by an average sipe interval in the second land portion block, it is preferable to fulfill the following relation.

$$1.00 \leq (h_2/hc) \leq 7.00$$

Here, it is more preferable to fulfill a relation of $1.05 \leq (h_2/hc) \leq 4.00$, and it is further more preferable to fulfill a relation of $1.09 \leq (h_2/hc) \leq 2.00$.

Further, as a value of hs is defined by an average sipe interval in the shoulder portion land portion block, it is preferable to fulfill the following relation.

$$1.05 \leq (hs/hc) \leq 4.00$$

Here, it is more preferable to fulfill a relation of $1.05 \leq (hs/hc) \leq 3.00$, and it is further more preferable to fulfill a relation of $1.10 \leq (hs/hc) \leq 1.79$.

Further, it is preferable to fulfill the following relation.

$$0.97 \leq (hs/h_2) \leq 2.15$$

Here, it is more preferable to fulfill a relation of $0.97 \leq (hs/h_2) \leq 1.71$, and it is further more preferable to fulfill a relation of $1.05 \leq (hs/h_2) \leq 1.27$.

(4) Functions and Effects

Next, functions and effects of the pneumatic tire 10 described above will be described. Specifically, functions and effects of a whole of the pneumatic tire 10, and functions and effects of the V-shape land portion row 100, the center land portion row 200, the shoulder land portion row 300in, and the shoulder land portion row 300out will be described.

(4.1) V-Shape Land Portion Row 100

The V-shape land portion block 101 is provided with the projection portion 110 on one side wall in the tire circumferential direction, and the recess portion 120 on another side wall. The inclined angles of the both side walls are the same to each other. The inclined angle of the inner sipes 130, 140 in the V-shape land portion block 101 or the terminal inclined groove 150 is the same as the inclined angle of the side walls. Thus, since the most projected portion 110a (center portion) including the apex of the projection portion 110 has the bent portion, the rigidity of the center portion becomes high and the rigidity of the whole of the V-shape land portion block 101 becomes high, compared to a land portion block formed in a rectangular shape without a bent portion. Consequently, the falling of the V-shape land portion block 101 and the lift off the road surface are suppressed, and therefore the ground contact area is increased.

Further, both side ends in the tire width direction of the V-shape land portion block 101 are low in the block rigidity compared to the center portion, and therefore the both end portions are deformed largely in the tire circumferential direction against the input in the tire circumferential direction in braking. Accordingly, the edge effect is improved.

Conventionally, in the V-shape land portion, the rigidity is improved in the center portion, and therefore the ground contact area of the center portion is secured by setting the width direction length of the V-shape land portion block to be longer than the circumferential direction thereof, and the length of the edge against the tire circumferential direction is made long by setting the width direction lengths of the both end portions to be long. Further, the edge effect by the block edge and the sipe edge is improved by setting the circumferential direction length of the V-shape land portion block to be small so as to arrange the V-shape land portion block in the tread as many as possible while deforming the V-shape land portion block appropriately to such an extent in which the ground contact area can be secured.

In the present embodiment, the circumferential direction length of the V-shape land portion block 101 is longer than the width direction length of the V-shape land portion block 101. Thus, the block rigidity in the tire circumferential direction of the V-shape land portion block 101 becomes high. Since the block rigidity in the tire circumferential direction of the V-shape land portion block 101 becomes high, the block rigidity in the tire circumferential direction of the center portion in the tire width direction becomes high, and the block rigidity in the tire circumferential direction of the both end portions in the tire width direction also becomes high. Further, the center portion is set to be high in the block rigidity against the both end portions.

Further, in the center portion of the V-shape land portion block 101, the ground contact area is further increased and the block rigidity is increased, and therefore the block edge and the sipe edge are pressed strongly against the road surface, so that the edge effect is also improved. In the both end portions of the V-shape land portion, large deformation is suppressed, and therefore the ground contact area is increased. Consequently, the edge effect by being pressed strongly against the road surface due to the increase of the block rigidity is improved instead of the edge effect by the deformation. Further, the wear resistant performance is improved by the increase of the block rigidity.

With this, the falling of the V-shape land portion block 101, in particular the falling in the tire circumferential direction, in braking of the vehicle to which the pneumatic tire 10 is mounted can be suppressed, and the wear of the V-shape land portion can be effectively suppressed. Further, the circumferential direction length of the V-shape land portion block 101 may be the same as the width direction length thereof from a viewpoint of the derived effect. It is because the effect can be derived unless the width direction length of the land portion block is set to be longer than the circumferential direction length thereof as the conventional one.

Further, in the V-shape land portion block 101, the rigidity in the tire circumferential direction is high in both of the center portion and the both end portions, and therefore the ground contact area of the V-shape land portion block 101 in braking in largely increased.

In the V-shape land portion block 101, the inclined angle θ1 of the projection portion side wall 111 (112) against the tire width direction is the same as the inclined angle θ2 of the recess portion side wall 121 (122) against the tire width direction. Further, the inclined angle θ5 of the sipe 130 and the terminal inclined groove 150 against the tire width direction is the same as the inclined angle θ1 (inclined angle θ2) of the projection portion side wall 111 (recess portion side wall 121) against the tire width direction.

Accordingly, the rotation directions of the moments generated in the projection portion side wall 111 (112) and the sipe 130 (140) of the V-shape land portion block 101 are the same direction to each other, and therefore the edge effects by the block edge and the sipe edge are derived in the same direction. With this, the scratching performance on a road surface by the block edge component due to the shape of the V-shape land portion block 101 and by the sipe edge component due to the sipe 130 can be improved.

Further, the end 131 of the sipe 130 and the end 151 of the terminal inclined groove 150 are terminated in the V-shape land portion block 101. Further, the side wall 100c of the V-shape land portion block 101 that forms the end 151 of the terminated inclined groove 150 is continued to the communication sipe 141 on the extension line of the communication sipe 141.

Accordingly, compared to a configuration in which the V-shape land portion block 101 is divided from one end to another end by the sipe or the inclined groove, the circumferential direction length of the V-shape land portion block 101 can be made longer than the width direction thereof. With this, as described above, the block rigidity of the V-shape land portion block 101 becomes high, and the ground contact area is increased, and the block edge and the sipe edge due to the block rigidity is increased. Consequently, according to the V-shape land portion row 100, the on-ice performance can be improved and the wear resistant performance can be improved.

In the V-shape land portion row 100, in order to avoid a decrease of the block edge and the sipe edge due to the deterioration of the block rigidity, the inclined groove (terminal inclined groove 150) is terminated, and a part of the inclined groove is replaced with the communication sipe 141. In a case in which the V-shape land portion block 101 is divided from one end to another end by the inclined groove, the circumferential direction length of the land portion block becomes smaller than the width direction length thereof, and therefore the block rigidity is deteriorated and the ground contact area is decreased.

The sipe as the communication sipe 141 is communicated with the terminal inclined groove 150. However, a portion where the communication sipe 141 exists is originally formed to generate the block edge by dividing using the inclined groove. Thus, the reason that the inclined groove is replaced with the sipe is to avoid the decrease of the edge as much as possible by forming the sipe while avoiding the deterioration of the block rigidity.

Further, the V-shape land portion block 101 is divided by the terminal inclined groove 150 and the communication sipe 141, and therefore the block rigidity thereof is lower than a portion continued without being divided. Thus, in a case in which the sipes are separated without communicating the sipe with the terminal inclined groove 150, the block rigidity of only a portion of the V-shape land portion block 101 where the sipes are separated becomes high, and therefore the rigidity difference is generated because a distribution of the block rigidity in the tire width direction of the V-shape land portion block 101 is not gently changed.

In the V-shape land portion block 101, by communicating the communication sipe 141 and the terminal inclined groove 150 with each other, the block rigidity of the V-shape land portion block 101 is largely improved compared to a configuration in which the inclined groove crosses the V-shape land portion block 101. With this, the ground contact area can be increased, and the edge effect can be improved. Consequently, the on-ice performance can be improved and the wear resistant performance can be improved.

In the V-shape land portion row 100, the communication sipe 142 communicated with the notched recess portion 170 is formed, and the width in the tire circumferential direction of the notched recess portion 170 becomes larger toward the side wall 100b of the V-shape land portion block 101. Accordingly, the block edge component of the V-shape land portion block 101 is increased by the notched recess portion 170.

Further, in the present embodiment, by forming the notched recess portion 170 formed as a wedge groove having a wedge shape (triangular shape), the block rigidity of a portion having a sharp angle between a sipe opening edge of the V-shape land portion block 101 near the opening edge of the communication sipe 142 and the side wall of the V-shape land portion block 101, becomes high although the block rigidity of the portion is originally low, compared to a configuration in which the communication sipe 142 is merely opened to the side wall 100b.

Accordingly, the force pressing the communication sipe 142 against the road surface becomes large, and therefore the edge effect of the sipe edge is improved. Further, when the block rigidity becomes high as described above, the sipe formed part can be prevented from being turned over to be lifted off the road surface in braking and therefore the wear resistant performance can be prevented from being deteriorated.

Generally, in a winter tire, a ground contact length near the tire equatorial line is long and a ground contact length at an outer side in the tire width direction is short. Thus, in the land portion block, by intentionally increasing the sipe edge and the block edge against the tire circumferential direction in a portion near the tire equatorial line having a long ground contact length, the block rigidity of a portion at the outer side in the tire width direction is secured while improving the edge effect.

Thus, in order to increase the block edge, the side wall at the tire circumferential direction end of the V-shape land portion block is made long near the tire equatorial line and is made short at the outer side in the tire width direction. However, if the sipe is formed in a similar way, the block rigidity of the V-shape land portion block at a side of the tire equatorial line is excessively decreased, and thereby rigidity balance of the V-shape land portion block in the tire width direction is deteriorated.

That is, the sipe 130 having a short length is formed at a side of the projection portion side wall 111 having a long length, and the sipe 140 having a long length is formed at a side of the projection portion side wall 112 having a short length, however if this configuration is formed in an opposite way, the rigidity balance of the V-shape land portion row 100 in the tire width direction is largely deteriorated.

In the V-shape land portion block 101, the sipe 130 having a short length is formed near the tire equatorial line, and the sipe 140 having a long length is formed at the outer side in the tire width direction, and thereby the block rigidity in the tire width direction is balanced, and the block rigidity at a side of the tire equatorial line CL is secured.

Further, by setting the sipe 140 at the outer side in the tire width direction to be long, the block rigidity is increased by the bent portion (projection portion 110 and recess portion 120), and the sipe edge is increased. Further, since the block rigidity at the outer side in the tire width direction becomes high, the force pressing the V-shape land portion block 101 including the sipe 140 against the road surface becomes large and therefore the sipe edge is increased. Further, contrary to the conventional V-shape land portion block in which only the rigidity of the center portion is high, the block rigidity is increased in the center portion having the bent portion, the portion of the V-shape land portion block 101 at the side of the tire equatorial line CL and the portion of the V-shape land portion block 101 at the outer side in the tire width direction. Consequently, the wear resistant performance of the V-shape land portion block 101 is improved.

In the V-shape land portion block 101, the circumferential direction length W1 of the inclined groove portion 161 located at one side (a side of the tire equatorial line) in the tire width direction with respect to the bent portion 163 is longer than the circumferential direction length W2 of the inclined groove portion 162 located at another side (a side of the tread end) in the tire width direction with respect to the bent portion 163.

Thus, in the V-shape land portion block 101, in order to prevent the land portion block from falling at the side of the tread end, namely in order to increase the block rigidity, the circumferential direction length of the land portion block at only one side in the tire width direction between the V-shape land portion blocks 101 adjacent to each other in the circumferential direction is made long, and the circumferential direction length of the inclined groove portion 162 is made smaller than the circumferential direction length of the inclined groove portion 161. Accordingly, the most projected portion 110a is located at a position different from the most recessed portion 120a.

(4.2) Center Land Portion Row 200

When the side wall in the circumferential direction of the inclined land portion block such as the land portion block 210 and the land portion block 260 formed in the center land portion row 200, inclined against the tire width direction receives input in the tire circumferential direction, as shown in FIGS. 7A and 7B, the force in the vector direction along the side wall at the tire circumferential direction end does not rotate the land portion block 210 (and the land portion block 210P), while the input to the land portion block 210 along the vector direction orthogonal to the side wall at the tire circumferential direction end generates moment to rotate the land portion block 210 (counterclockwise rotation direction in FIGS. 7A and 7B).

The directions of the rotation moments generated in the crossing inclined groove 270 and the terminal inclined groove 220 are the same to each other, and therefore the edge effects of the land portion blocks due to the groove wall portions of the crossing inclined groove 270 and the terminal inclined groove 220 are derived in the same direction. Thus, the block edge component is increased as the whole of the center land portion row 200.

As shown in FIG. 7A, the rotation moments generated in the land portion block 210 and the sipe 230 against the input in the tire circumferential direction to the land portion block 210 are generated in opposite directions to each other, and thereby the rotation moments are cancelled to each other. Consequently, the deformation of the land portion block 210 is suppressed.

Thus, compared to a configuration in which the sipe 230 (and the sipe 290) and the crossing inclined groove 270 are extended in the same direction, the block rigidity of the center land portion row 200 is increased largely. In this way, since the block rigidity of the whole of the center land portion row 200 is increased, the ground contact area is increased and the force pressing the land portion block 210 (and the land portion block 260) and the sipe 230 (and the sipe 290) against the road surface is increased. With this, the edge effect is improved, so that the on-ice performance can be improved and the wear resistant performance can be improved.

Further, the terminal incline groove 220 and the notched groove 240 are located on the extension line of the crossing inclined groove 270. Further the hook-shaped groove portion 273 is formed at the end of the crossing inclined groove 270. Thus, the block rigidity is secured and the block edge component is increased by the grooves behaving like one lug groove crossing the center land portion row 200.

Further, the circumferential direction groove 60 is provided with the circumferential direction groove portion 61 extended in the tire circumferential direction and inclined against the tire circumferential direction, and the inclined lug groove portion 62 inclined in the same direction as the terminal inclined groove 220 against the tire width direction. The block edge component is further increased by the circumferential direction groove 60 extended in the tire circumferential direction in a non-linear manner.

In the center land portion row 200, the side walls 210c, 210d, 220c, 220d located at the ends in the tire circumferential direction of the land portion block 210 and the land portion block 260 are inclined against the tire width direction. Further, these side walls are inclined in opposite direction to the sipe 230 and the sipe 290 against the tire width direction.

Accordingly, compared to a configuration in which the sipe 230 and the sipe 290 are extended in the same direction to these side walls, the deterioration of the block rigidity of the center land portion row 200 can be suppressed. With this, the on-ice performance can be ensured, and the wear resistant performance can be improved.

As described above, the ratio S1/S2, which is the negative ratio of the center land portion row 200, indicates a ratio of the groove area in the center land portion row 200. In a case in which the negative ratio is large, the area of the groove portion is large and therefore the edge effect by the block edge component is improved, while the area of the land portion block is small and therefore the block rigidity is deteriorated. Consequently, the ground contact area is decreased and the wear resistant performance is deteriorated.

On the other hand, in a case in which the negative ratio is small, the area of the groove portion is small and the area of the land portion block is large, and therefore the block rigidity is increased, so that the ground contact area is increased and the wear resistant is improved, however the edge effect by the block edge component of the groove is deteriorated.

Thus, the block rigidity of the center land portion row 200 is suitably improved by the terminal inclined groove 220, the terminal inclined groove 280 and the crossing inclined groove 270. In this way, by optimizing the negative ratio of the whole of the center land portion row 200, the block rigidity is increased and the ground contact area is increased. Further, the force pressing the land portion block 210 and the land portion block 260, and the sipe 230 and the sipe 290 against the road surface is increased. With this, the edge effect is improved, so that the on-ice performance can be improved and the wear resistant performance can be improved.

Further, as described above, the ratio S1/S2 is preferably set in a range between 0.05 and 0.25. In a case in which the ratio S1/S2 is more than 0.25, the negative ratio becomes large, and the area of the land portion block is largely decreased, and therefore the block rigidity is excessively decreased. Consequently, the ground contact area is largely decreased, and the wear resistant performance is largely deteriorated.

Further, in a case in which the ratio S1/S2 is less than 0.05, the negative ratio becomes small, and the area of the groove portion is largely decreased, and therefore the draining performance is not secured at all. Further, the edge effect by the block edge of the groove is largely deteriorated.

(4.3) Shoulder Land Portion Row 300in and Shoulder Land Portion Row 300out

In the shoulder land portion row 300in (the shoulder land portion row 300out is similar, hereinafter the same), the amplitude A1 of the circumferential direction sipe 320 is larger than a size of the amplitude A2 of the width direction sipe 340 adjacent to the circumferential direction sipe 320.

By setting the sipe interval to be large and by setting the pitch length of the land portion block 310 that forms the shoulder land portion row 310in to be small, the rigidity of the land portion block 310 is increased and the ground contact area is increased. Further, the force pressing the block edge and the sipe edge against the road surface is increased and the edge effect due to and the increase of the block edge is improved, and the wear resistant performance is improved.

However, if the block rigidity in the tire circumferential direction of the land portion block 310 is not deteriorated, it is preferable that the edge effect is large. Thus, by forming the circumferential direction sipe 320, which hardly decreases the rigidity in the tire circumferential direction and derives the edge effect in the tire width direction, in the land portion block 310, the amplitude A1 of the zigzag portion is made large. With this, the sipe edge in the tire circumferential direction is derived, so that the edge effect in the tire circumferential direction can be improved.

Further, the circumferential direction linear sipe 351 having a linear shape and the circumferential direction linear sipe 352 having a linear shape are formed in the land portion block 310. The circumferential direction sipe 320, the circumferential direction linear sipe 351 and the circumferential direction linear sipe 352 can increase the edge effect in the tire width direction.

In the shoulder land portion row 300in, deformation of a portion of the land portion block 300 at a side of the tire equatorial line CL is not suppressed contrary to a portion at a side of the tread end in which an inclined side wall of a buttress portion, which is a side wall at an outer side of the tread end, has high rigidity, and the ground contact length of the portion at the side of the tire equatorial line CL is longer than that of the portion at the side of the tread end.

Thus, in order to derive the sipe edge largely, the end 332 of the width direction sipe 330 at the side of the tire equatorial line CL is communicated with the circumferential direction sipe 320. Further, the end 331 of the width direction sipe 330 is communicated with the circumferential direction groove 40. Accordingly, the sipe edge component of the land portion block 310 can be increased.

On the other hand, the end 341 of the width direction sipe 340 at the side of the tire equatorial line CL is not communicated with the circumferential direction sipe 320 but terminated in the land portion block 310. The side wall of the land portion block 310 at the outer side of the tread end is different from the side wall at the side of the tire equatorial line CL and has high rigidity due to the inclined side wall of the buttress portion, and therefore the deformation of the side wall at the outer side of the tread end is suppressed. Further, the side wall at the outer side of the tread end has the ground contact length shorter than that of the side wall at the side of the tire equatorial line CL, and thereby the block rigidity in the tire circumferential direction of the land portion block 310 is deteriorated by deriving the sipe edge largely at the side of the tire equatorial line CL, while in order to increase the block rigidity, the width direction sipe 340 at the outer side of the tread end is not communicated with the circumferential direction sipe 320 but terminated in the land portion block 310. Further, another end of the width direction sipe 340 is terminated without being communicated with the main groove and the buttress portion.

Accordingly, although the block rigidity of the land portion block 310 at the side of the tire equatorial line CL is deteriorated, since the block rigidity at the outer side of the tread end is increased, the block rigidity of the shoulder land portion row 300in can be kept. Further, by keeping the block rigidity of the shoulder land portion row 310in, the ground contact area is secured and the edge effect by the sipe edge component is improved. Consequently, the on-ice performance can be improved and the wear resistant performance can be kept.

Further, the end 341 of the width direction sipe 340 is located in the range of the amplitude A1. Further, the width direction sipe 340 is located on the extension line of the width direction sipe 330 communicated with the apex 323 of the circumferential direction sipe 320 having a zigzag shape. With such a configuration, the edge effect by the sipe edge component can be further improved.

In the shoulder land portion row 300in, the step portion 360 having a notched shape is formed in the side wall 310b. The step portion 360 is formed at the end of the land portion block 310 at the side of the tread end in the tire width direction. The step portion 360 is provided with the raised bottom surface 361. The raised bottom surface 361 is formed in a rectangular shape extended in the tire width direction.

Thus, by forming the step portion 360 formed to notch the land portion block 310, the volume of the lug groove 70 formed between the land portion blocks 310 adjacent to each other is increased, and therefore so-called snow column shearing force is increased. Further, the draining performance is also improved.

Further, the step portion 360 is formed at the end of the land portion block 310 at the side of the tread end, and thereby ice and snow can be easily taken in, and the ice and snow hardened as the snow column can be drained easily.

Further, the step portion 360 is not formed as a deep groove bottom portion, and the step portion 360 is formed at the end at the side of the tread end. Specifically, the ice and snow hardened as the snow column can be easily drained by the raised bottom surface 361.

Further, since the step portion 360 is formed, the side wall of the land portion block 310 at the circumferential direction end is bent at a position of the step portion 360. Consequently, compared to the side wall having a linear shape without the step portion 360, the block edge component by the side wall 310b of the land portion block 310 is increased.

Further, since the raised bottom surface 361 is formed, the volume of the land portion block 310 at an upper side of the raised bottom surface 361 (outer side in the tire width direction) is decreased, while the land block portion is formed by the step portion 360 at a lower side of the raised bottom surface 361 (inner side in the tire width direction), similar to the side of the tire equatorial line CL. Further, the deformation of the land portion block 310 at the side of the tread end is suppressed by the inclined side wall of the buttress portion having high rigidity, and thereby the block rigidity of the land portion block 310 can be kept.

That is, with the step portion 360, the on-ice performance can be improved and the wear resistant performance can be kept. Further, the on-snow performance and the draining performance can be improved.

(4.4) Relation Between Pitch and Sipe

As described above, it is preferable that a value of (the average sipe interval h)/(the average pitch length L) is set to fulfill a relation of $0.130 \leq (h/L) \leq 0.400$. In a case in which the value of h/L is less than 0.130, the pitch length is relatively large, while the sipe interval is extremely small. Accordingly, the number of the sipes is extremely large, and thereby the block rigidity of the land portion block becomes extremely low.

On the other hand, in a case in which the value of h/L is more than 0.400, the sipe interval is relatively large, while the pitch length is extremely small. Accordingly, the number of the sipes is extremely small, for example one or two, however the pitch length is extremely small. Thus, even if the sipe interval is made large, the block rigidity of the land portion block is not increased to the contrary. Further, the sipe edge component is extremely decreased.

Further, as described above, it is preferable to fulfill the relation of $140 \leq (h \times L) \leq 350$. In a case in which the value of (h×L) of the average sipe interval and the average pitch length is less than 140 $(mm)^2$, the sipe interval and the pitch length are excessively small. In a case in which the sipe interval is small, the land portion block is divided into small portions, and therefore the block rigidity of the land portion block is deteriorated. Further, in a case in which the pitch length is small, the block rigidity of the land portion block is deteriorated. As a result, the block rigidity is excessively deteriorated.

On the other hand, in a case in which the value (h×L) is more than 350 $(mm)^2$, the sipe interval and the pitch length are excessively large. In a case in which the sipe interval is excessively large, although the block rigidity of the land portion block is high, the number of the sipes is excessively small, and therefore the sipe edge effect is not derived. In a case in which the pitch length is large, although the block rigidity is high, the number of the pitches in the whole circumference of the tire is decreased, and therefore the block edge effect is extremely deteriorated. As a result, the edge effect is excessively deteriorated.

Further, in a winter tire such as a studless tire, the ground contact length becomes longer in the center region (center portion land portion block), the second region (second portion land portion block), and the shoulder region (shoulder portion land portion block) in this order, and the ground contact length of the center region is the longest. Thus, it is effective that the sipe edge and the block edge in the tire circumferential direction in braking are derived by using long ground contact length. By setting the sipe interval of the center region to be smaller than those in the second region and the shoulder region, the edge effect toward the circumferential direction is largely derived.

As described above, in the center portion land portion block, it is preferable to fulfill the relation of 3.0 mm≤h≤7.1 mm. In a case in which h is less than 3.0 mm, the land portion block is divided into small portions and therefore the block rigidity is excessively decreased. On the other hand, in a case in which h is more than 7.1 mm, although the block rigidity is high, the number of the sipes is excessively small, and therefore the sipe edge is not derived and the sipe edge effect is excessively deteriorated.

Further, it is necessary to enhance the block rigidity of the shoulder region and the second region as the region becomes closer to a side of the tread end because the number of the sipes in the center portion is made large. Further, the input of the lateral force is larger toward the side of the tread end, and the lateral force in the shoulder region is the largest. Thus, in order to enhance the block rigidity, the sipe interval is made large.

Further, as described above, in the shoulder land portion block, it is preferable to fulfill the relation of 3.7 mm≤h≤8.5 mm. In a case in which h is less than 3.7 mm, the block is divided into small portions, and therefore the block rigidity is excessively deteriorated. On the other hand, in a case in which h is more than 8.5 mm, although the block rigidity is high, the sipe edge effect is excessively deteriorated. Here, the numerical range of the average sipe interval in the second region is similar to that in the shoulder region.

Further, in the second region, the ground contact length is shorter than that in the center region and longer than that in the shoulder region. Thus, in order to enhance the sipe edge effect and to increase the block rigidity, the sipe interval is set to be larger than that in the center region and smaller than that in the shoulder region. Further, based on the same reason to the center region and the shoulder region, it is preferable to set the average sipe interval in the second region within the range described above.

Further, as described above, the average sipe interval h of the land portion block of the whole of the pneumatic tire 10 is set in the range between 3.4 mm and 7.9 mm. With this, the sipe interval is made large and the number of the sipes is made small. Consequently, the block rigidity is increased, and one sipe edge and one block edge of one land portion block are increased to a maximum range capable of increasing the sipe edge and the block edge.

In a case in which h is less than 3.4 mm, the land portion block is divided into small portions, and therefore the block rigidity is excessively deteriorated. On the other hand, in a case in which h is more than 7.9 mm, although the block rigidity is high, the sipe edge effect is excessively deteriorated.

Further, as described above, it is preferable that the average pitch length L of the land portion block of the whole of the pneumatic tire 10 is set to fulfill the range of 19.2 mm≤L≤44.6 mm. In a case in which the pitch length is less than 19.2 mm, the pitch length is excessively small, and therefore the block rigidity is excessively deteriorated. In a case in which the pitch length is more than 44.6 mm, the pitch length is excessively large, and therefore the block rigidity is increased, however the number of the sipes in the whole circumference of the tire is decreased. Consequently, the block edge effect is largely deteriorated to be excessively small.

More specifically, in a case in which the average sipe interval is less than 3.4 mm or the average pitch length is more than 44.6 mm, the sipe interval is excessively small and the block is divided into small portions, and thereby the block rigidity is excessively deteriorated. Further, in a case in which the pitch length is excessively large, the number of the pitches is decreased, and thereby the block edge effect is excessively deteriorated. Further, even if the pitch length is made large, the block rigidity is not increased because the block is divided into the small portions by the sipes.

Further, in a case in which the average sipe interval is more than 7.9 mm or the average pitch length is less than 19.2 mm, the sipe interval is large, and therefore the block rigidity is increased, however the number of the sipes is excessively small, and thereby the sipe edge is not derived and the sipe edge effect is excessively deteriorated. Further, the pitch length is small, and the block rigidity of each block is excessively deteriorated. As a result, the total edge effect is deteriorated, and the block rigidity is not increased.

Further, in a case in which the average sipe interval is less than 3.4 mm or the average pitch length is less than 19.2 mm, although the sipe edge component is increased, the sipe interval is excessively small and the block is divided into small portions, and thereby the block rigidity is excessively deteriorated. Further, since the pitch length is small and the block rigidity of each block is excessively deteriorated, the block edge effect is excessively deteriorated. Accordingly, the block rigidity is excessively deteriorated, and the total edge is also decreased.

Further, in a case in which the average sipe interval is more than 7.9 mm or the average pitch length is more than 44.6 mm, the sipe interval is large, and therefore the block rigidity is increased, however the number of the sipes is excessively small, and thereby the sipe edge is not derived and the sipe edge effect is excessively deteriorated. Further, in a case in which the pitch edge is excessively large, the number of the pitches is decreased, and thereby the block edge effect is excessively deteriorated. Further, even if the pitch length is made large, the block rigidity is not increased because the block is divided into small portions by the sipe.

Further, in a standard tire size (hereinafter, referred to as standard tire size) having a tire width SEC (hereinafter the same) of 165, 175, 185, 195, 205, 215, 225, 235, 245 or 255 in a tire for a passenger vehicle (Passenger car tire), which is defined in the standard of JATMA (or similar standard such as ETRTO, and TRA), it is preferable that the average sipe interval and the average pitch length are set to fulfill the following ranges of 4.2 mm≤h≤6.3 mm
23.6 mm≤L≤35.4 mm.

Further, the tire width SEC denotes 195 (mm) in a tire of 195/65R15.

In the standard tire size, it is preferable that the average sipe interval and the average pitch length of the center portion land portion block are set to fulfill the following ranges of 3.7 mm≤h≤5.6 mm
23.6 mm≤L≤35.4 mm.

In the standard tire size, it is preferable that the average sipe interval and the average pitch length of the shoulder portion land portion block are set to fulfill the following ranges of 4.5 mm≤h≤6.8 mm
23.6 mm≤L≤35.4 mm.

In the standard tire size, it is preferable that the average sipe interval and the average pitch length of the second portion land portion block are set to fulfill the following ranges of 4.1 mm≤h≤6.1 mm
23.6 mm≤L≤35.4 mm.

By fulfilling such relations, the sipe interval and the pitch length are optimized. By appropriately decreasing the number of the sipes, the block rigidity is increased, and by appropriately setting the pitch length to be small, the number of the pitches and the number of the blocks are increased to enhance the block edge effect. Consequently, the block rigidity can be increased and the total edge effect can be improved. Further, the demerit of a configuration with the average sipe interval and the average pitch length being out of the ranges described above are as described above.

Further, in a large tire size having the tire width SEC of 265, 275, 285, 295 or 305 (hereinafter, referred to as large SEC tire size) defined in the standard of JATMA, it is preferable that the average sipe interval and the average pitch length are set to fulfill the following ranges of 6.3 mm<h≤7.9 mm
35.4 mm<L≤44.6 mm.

In the large SEC tire size, it is preferable that the average sipe interval and the average pitch length of the center portion land portion block are set to fulfill the following ranges of 5.6 mm<h≤7.1 mm
35.4 mm<L≤44.6 mm.

In the large SEC tire size, it is preferable that the average sipe interval and the average pitch length of the shoulder portion land portion block are set to fulfill the following ranges of 6.8 mm<h≤8.5 mm
35.4 mm<L≤44.6 mm.

In the large SEC tire size, it is preferable that the average sipe interval and the average pitch length of the second portion land portion block are set to fulfill the following ranges of 6.1 mm<h≤7.7 mm
35.4 mm<L≤44.6 mm.

With this, in the tire having such a tire size, the block rigidity can be increased and the total edge effect can be improved.

Further, in a small tire size having the tire width SEC of 135, 145 or 155 (hereinafter, referred to as small SEC tire size) defined in the standard of JATMA, it is preferable that the average sipe interval and the average pitch length are set to fulfill the following ranges of 3.4 mm≤h<4.2 mm
19.2 mm≤L<23.6 mm.

In the small SEC tire size, it is preferable that the average sipe interval and the average pitch length of the center portion land portion block are set to fulfill the following ranges of 3.0 mm≤h<3.7 mm
19.2 mm≤L<23.6 mm.

In the small SEC tire size, it is preferable that the average sipe interval and the average pitch length of the shoulder portion land portion block are set to fulfill the following ranges of 3.7 mm≤h<4.5 mm
19.2 mm≤L<23.6 mm.

In the small SEC tire size, it is preferable that the average sipe interval and the average pitch length of the second portion land portion block are set to fulfill the following ranges of 3.3 mm≤h<4.1 mm
19.2 mm≤L<23.6 mm.

With this, in the tire having such a tire size, the block rigidity can be increased and the total edge effect can be improved.

As described above, the value of (the average block edge component Dball/the average sipe edge component Dsall)/average block rigidity G is preferably set to fulfill the relation of 2.20≤(Dball/Dsall)/G≤4.00. In a case in which the value of (Dball/Dsall)/G is less than 2.20 $(mm)^3/N$, although the sipe edge component is extremely large against the average block rigidity of the land portion blocks, the block edge component is extremely decreased. This is because the number of the sipes is large and the sipe interval is small, and thereby the block rigidity is excessively deteriorated.

On the other hand, in a case in which the value of (Dball/Dsall)/G is more than 4.00 $(mm)^3/N$, although the block edge component is extremely large against the average block rigidity of the land portion blocks, the sipe edge component is extremely decreased. This is because the number of the sipes is small and the sipe interval is large, and thereby the block rigidity is excessively increased.

Further, the width direction sipe may be inclined against the tire circumferential direction (tire equatorial line CL) as long as the width direction sipe is extended in the tire width direction because the edge component of the tire circumferential direction is generated.

As described above, the value of (the average block edge component Dball)/(the average sipe edge component Dsall) is preferably set to fulfill the relation of $0.15 \leq (Dball/Dsall) \leq 0.48$. In a case in which the value of Dball/Dsall is less than 0.15, although the sipe edge component is made extremely large, the block edge component is extremely decreased. This is because the number of the sipes is large and the sipe interval is small, and thereby the block rigidity of the land portion block is excessively deteriorated.

On the other hand, the value of Dball/Dsall is more than 0.48, although the block edge component is made extremely large, the sipe edge component is extremely decreased. This is because the number of the sipes is small and the sipe interval is large, and thereby the block rigidity of the land portion block is excessively increased.

As described above, the value of (the average sipe interval hs of the shoulder portion land portion block)/(the average sipe interval hc of the center portion land portion block) is preferably set to fulfill the relation of $1.05 \leq (hs/hc) \leq 4.00$. In a case in which the value of hs/hc is less than 1.05, the sipe interval of the shoulder portion land portion block is small, and thereby the number of the sipes is made large and the block rigidity of the land portion block is extremely deteriorated. Further, although the sipe edge component is increased, the block edge component is excessively decreased.

On the other hand, in a case in which the value of hs/hc is more than 4.00, the sipe interval of the shoulder portion land portion block is large, and thereby the number of the sipes is made excessively small. Consequently, although the block edge component is increased, the sipe edge component is excessively decreased.

Further, other numerical ranges relating to the pitch and the sipe described above are determined so as to derive both of the block rigidity of the land portion block and the edge component as described above. With this, the on-ice performance and the wear resistant performance can be obtained at a high level.

(4.5) Evaluation Test

Next, a method and a result of an evaluation test performed to check the relation between the average sipe interval and the average pitch length will be further described.

Table 1 shows a specification and a test result (on-ice braking performance and wear resistant performance) of each of pneumatic tires (studless tires) according to examples. Table 2 shows a specification and a test result of each of pneumatic tires (studless tires) according to a conventional example, comparative examples and the examples.

Further, Table 3 through Table 6 show results of an additional test of each of the pneumatic tires (studless tires) according to the comparative examples and the examples.

TABLE 1

| | | No | | | | | | |
|---|---|---|---|---|---|---|---|---|
| | | 2 | 3 | 4 | 5 | 6 | 7 | 8 |
| | NOTE | EXAMPLE 1 | EXAMPLE 2 | EXAMPLE 3 | EXAMPLE 4 | EXAMPLE 5 | EXAMPLE 6 | EXAMPLE 7 |
| SIPE INTERVAL/ PITCH LENGTH | h/L | 0.18 | 0.13 | 0.18 | 0.18 | 0.18 | 0.18 | 0.18 |
| SIPE INTERVAL * PITCH LENGTH | h * L | 65.2 | 35.6 | 99.2 | 153 6 | 223 3 | 308.1 | 352.3 |
| AVERAGE SIPE INTERVAL(mm) | h | 3 40 | 3 90 | 4.20 | 5 20 | 6.30 | 7 40 | 7 90 |
| CENTER PORTION SIPE INTERVAL(mm) | hc | 3.0 | 3.5 | 3 7 | 4 7 | 5.6 | 6.6 | 7.1 |
| SECOND PORTION SIPE INTERVAL(mm) | h2 | 3.3 | 3 8 | 4.1 | 5.1 | 6.1 | 7.2 | 7.7 |
| SHOULDER PORTION SIPE INTERVAL(mm) | hs | 3.7 | 4 2 | 4.5 | 5.7 | 6.8 | 8 0 | 8.5 |
| AVERAGE PITCH LENGTH(mm) | L | 19 2 | 22.0 | 23.6 | 29 5 | 35 4 | 41 6 | 44.6 |
| ON-ICE BRAKING PERFORMANCE | | 104 | 109 | 112 | 115 | 108 | 104 | 101 |
| WEAR RESISTANT PERFORMANCE | | 107 | 112 | 119 | 125 | 127 | 130 | 134 |

TABLE 2

| | | No. | | | | | |
|---|---|---|---|---|---|---|---|
| | | 1 | 2 | 3 | 4 | 5 | 6 |
| | NOTE | COMPAR- ATIVE EXAMPLE 1 | COMPAR- ATIVE EXAMPLE 2 | COMPAR- ATIVE EXAMPLE 3 | COMPAR- ATIVE EXAMPLE 4 | COMPAR- ATIVE EXAMPLE 5 | CON- VENTIONAL EXAMPLE |
| SHOULDER PORTION SIPE INTERVAL/ CENTER PORTION SIPE INTERVAL | hs/hc | 0.82 | 0.82 | 0.82 | 0.89 | 0.92 | 1.00 |
| SECOND PORTION SIPE INTERVAL/ CENTER PORTION SIPE INTERVAL | h2/hc | 0.82 | 0.89 | 1.00 | 0.82 | 1.12 | 1 00 |

TABLE 2-continued

| | | | | | | | |
|---|---|---|---|---|---|---|---|
| SHOULDER PORTON SIPE INTERVAL/ SECOND PORTION SIPE NTERVAL | hs/h2 | 1.00 | 0.92 | 0.82 | 1.09 | 0.82 | 1.00 |
| ON-CE BRAKING PERFORMANCE | | 97 | 97 | 97 | 98 | 99 | 100 |
| WEAR RESISTANT PERFORMANCE | | 122 | 125 | 130 | 127 | 118 | 100 |

| | | No. | | | | |
|---|---|---|---|---|---|---|
| | | 7 EXAMPLE 1 | 8 EXAMPLE 2 | 9 EXAMPLE 3 | 10 EXAMPLE 4 | 11 EXAMPLE 5 |
| SHOULDER PORTION SIPE INTERVAL/ CENTER PORTION SIPE INTERVAL | | 1.00 | 1.12 | 1.21 | 1.21 | 1.21 |
| SECOND PORTION SIPE INTERVAL/ CENTER PORTION SIPE INTERVAL | | 1.21 | 092 | 1.00 | 1.09 | 1.21 |
| SHOULDER PORTON SIPE INTERVAL/ SECOND PORTION SIPE NTERVAL | | 0.89 | 1.21 | 1.21 | 1.12 | 1.00 |
| ON-CE BRAKING PERFORMANCE | | 105 | 110 | 112 | 115 | 108 |
| WEAR RESISTANT PERFORMANCE | | 107 | 120 | 104 | 111 | 113 |

TABLE 3

| | | ADDITIONAL EXAMPLE - COMPARATIVE EXAMPLE | | | | | |
|---|---|---|---|---|---|---|---|
| | NOTE | 1 | 2 | 3 | 4 | 5 | 6 |
| SIPE INTERVAL/PITCH LENGTH | h/L | 0.12 | 0.13 | 0.14 | 0.20 | 0.25 | 0.45 |
| SIPE INTERVAL * PITCH LENGTH | h * L | 168.8 | 188.0 | 178.6 | 128.2 | 100.0 | 142.2 |
| AVERAGE SIPE INTERVAL(mm) | h | 4.5 | 5.0 | 5.0 | 5.0 | 5.0 | 8.0 |
| CENTER PORTION SIPE INTERVAL(mm) | he | 5.0 | 4.5 | 4.5 | 4.5 | 4.5 | 7.1 |
| SECOND PORTION SIPE INTERVAL(mm) | h2 | 4.5 | 4.9 | 4.9 | 4.9 | 4.9 | 7.8 |
| SHOULDER PORTION SIPE INTERVAL(mm) | hs | 4.0 | 5.5 | 5.5 | 5.5 | 5.5 | 8.6 |
| AVERAGE PITCH LENGTH(mm) | L | 37.5 | 37.6 | 35.7 | 25.6 | 20.0 | 17.8 |
| ON-ICE BRAKING PERFORMANCE | | 97 | 106 | 107 | 108 | 109 | 95 |
| WEAR RESISTANT PERFORMANCE | | 96 | 113 | 112 | 120 | 118 | 130 |

TABLE 4

| | | ADDITIONAL EXAMPLE - ADDITIONAL COMPARATIVE EXAMPLE | | | | | | |
|---|---|---|---|---|---|---|---|---|
| | NOTE | 1 | 2 | 3 | 4 | 5 | 6 | 7 |
| AVERAGE BLOCK/ SIPE EDGE COMPONENT | P | 0.30 | 0.45 | 0.47 | 0.35 | 0.40 | 0.50 | 1.00 |
| SECOND PORTION/ CENTER PORTION | P2/Pc | 1.50 | 2.60 | 4.10 | 1.13 | 1.10 | 1.10 | 5.90 |
| (SHOULDER PORTION/ SECOND PORTION) * (CENTER PORTION/ SECOND PORTION) | (Ps/P2) * (Pc/P2) | 1.50 | 0.50 | 0.30 | 2.90 | 3.50 | 3.80 | 0.10 |
| CENTER PORTION BLOCK/ SIPE EDGE COMPONENT | Pc | 0.15 | 0.19 | 0.14 | 0.18 | 0.19 | 0.22 | 0.29 |
| SECOND PORTION BLOCK/ SIPE EDGE COMPONENT | P2 | 0.23 | 0.50 | 0.57 | 0.20 | 0.21 | 0.25 | 1.71 |
| SHOULDER PORTION BLOCK/ SIPE EDGE COMPONENT | Ps | 0.52 | 0.65 | 0.70 | 0.67 | 0.80 | 1.03 | 1.01 |

TABLE 4-continued

|  | NOTE | ADDITIONAL EXAMPLE - ADDITIONAL COMPARATIVE EXAMPLE | | | | | | |
|---|---|---|---|---|---|---|---|---|
|  |  | 1 | 2 | 3 | 4 | 5 | 6 | 7 |
| ON-ICE BRAKING PERFORMANCE |  | 109 | 98 | 102 | 106 | 104 | 102 | 106 |
| WEAR RESISTANT PERFORMANCE |  | 122 | 110 | 106 | 111 | 113 | 92 | 85 |

TABLE 5

|  | NOTE | ADDITIONAL EXAMPLE - COMPARATIVE EXAMPLE | | | | | | | |
|---|---|---|---|---|---|---|---|---|---|
|  |  | 1 | 2 | 3 | 4 | 5 | 6 | 7 | 8 |
| (AVERAGE BLOCK/SIPE EDGE COMPONENT)/AVERAGE BLOCK RIGIDITY | R | 2.00 | 2.28 | 2.50 | 3.13 | 3.50 | 3.60 | 3.30 | 4.10 |
| SECOND PORTION/CENTER PORTION | R2/Rc | 1.00 | 1.11 | 1.20 | 1.47 | 1.85 | 0.78 | 1.10 | 1.00 |
| SHOULDER PORTION/SECOND PORTION | Rs/R2 | 1.00 | 1.04 | 1.20 | 1.50 | 1.85 | 3.00 | 2.60 | 1.00 |
| CENTER PORTION | Rc | 2.00 | 2.10 | 2.06 | 2.01 | 1.67 | 2.62 | 2.00 | 4.10 |
| SECOND PORTION | R2 | 2.00 | 2.33 | 2.47 | 2.95 | 3.10 | 2.04 | 2.20 | 4.10 |
| SHOULDER PORTION | Rs | 2.00 | 2.42 | 2.97 | 4.43 | 5.73 | 6.13 | 5.71 | 4.10 |
| ON-ICE BRAKING PERFORMANCE |  | 100 | 102 | 107 | 115 | 108 | 104 | 106 | 70 |
| WEAR RESISTANT PERFORMANCE |  | 100 | 104 | 111 | 125 | 108 | 106 | 108 | 140 |

TABLE 6

|  | NOTE | ADDITIONAL EXAMPLE - COMPARATIVE EXAMPLE | | | |
|---|---|---|---|---|---|
|  |  | 1 | 2 | 3 | 4 |
| SHOULDER PORTION SIPE INTERVAL/CENTER PORTION SIPE INTERVAL | hs/hc | 2.20 | 1.60 | 4.02 | 9.00 |
| SECOND PORTION SIPE INTERVAL/CENTER PORTION SIPE INTERVAL | h2/hc | 1.07 | 1.08 | 7.03 | 4.10 |
| SHOULDER PORTION SIPE INTERVAL/SECOND PORTION SIPE INTERVAL | hs/h2 | 2.06 | 1.48 | 0.57 | 2.20 |
| ON-ICE BRAKING PERFORMANCE |  | 104 | 106 | 94 | 93 |
| WEAR RESISTANT PERFORMANCE |  | 114 | 116 | 108 | NA |

(4.5.1) Basic Configurations of Tires for Evaluation Test and Test Condition

A size of each of pneumatic tires used for the evaluation test and a test condition are as described below.
Tire size: 195/65R15
Rim size: 6J×15
Air pressure: 240 kPa (front tire and rear tire)
Vehicle: Anti-lock brake system (ABS) installed vehicle
Further, the tread pattern having a shape shown in FIG. 3 is adopted. "The on-ice braking performance" corresponds to an average value of five values excluding the maximum value and the minimum value after a distance (braking distance) to stop the vehicle by performing hard braking at a speed of 20 km/h (ABS activated) on an ice road test course at each of a stage of a new tire and a stage after initial travelling is measured at seven times. Further, the on-ice braking performance is indexed against the tire according to the conventional example (comparative example 1) defined as 100. As the value is larger, the braking distance is shorter and the on-ice braking performance is higher.

"The wear resistant performance" is evaluated based on a remaining groove depth after a test target tire is mounted to the vehicle on which a weight corresponding to two passengers is mounted and the vehicle is travelled on an asphalt pavement road for 10,000 km. Specifically, the wear resistant performance is indexed against the remaining groove depth of the tire according to the conventional example (comparative example 1) defined as 100. As the value is larger, the remaining depth is deeper and the wear resistant performance is higher.

(4.5.2) Evaluation Test Result

As shown in Table 1, in the tires according to the examples (No. 2 through No. 8), "the on-ice braking performance" and "the wear resistant performance" are improved. In particular, in No. 4 through No. 6, both of the performance are balanced well and improved largely.

Further, as shown in Table 2, by setting the value of (hs/hc) of the sipe intervals of the shoulder portion land portion block (shoulder portion) and the center portion land portion block in the range described above, in the tire according to the examples 1 through 5, "the on-ice braking performance" and "the wear resistant performance" are improved compared to the tire according to the conventional example.

As shown by the test results in Table 1 and Table 2, in a case in which the priority is given to "the wear resistant performance", it is important that the average pitch length and the average sipe interval are set to be large. On the other hand, in a case in which the priority is given to "the on-ice braking performance" while improving the wear resistant performance, it is not always important that the average pitch length and the average sipe interval are merely set to be large, while it is important that the average pitch length and the average sipe interval are set to be balanced well.

This is because, as described above, almost all of the vehicles in recent years normally have ABS and therefore the braking is repeated in a range having a relatively small slip ratio in which the ABS is activated (namely, a range having high friction coefficient (μ)) rather than in a range having a large slip ratio in which the tire is locked completely and slipped on the ice road surface. In such a case, the on-ice braking performance is improved by securing some extent of the block rigidity of the land portion block rather than by forming many sipes.

Table 3 shows, similar to Table 1, a test result relating to the average sipe interval and the average pitch length. Table 4 shows a test result relating to the sipe edge component. Table 5 shows a test result relating to the average block rigidity. Table 6 shows, similar to Table 2, a test result relating the sipe interval.

As shown in Table 3 through Table 6, in the additional examples, "the on-ice braking performance" and "the wear resistant performance" are improved.

(5) Other Embodiment

As described above, the contents of the present invention are described with reference to the examples, however the present invention is not limited to those descriptions. It is obvious for a person skilled in the art to adopt various modifications and improvement.

For example, in the embodiment described above, the center land portion row 200 is arranged at the position including the tire equatorial line CL, and the V-shape land portion row 100 is arranged at the outer side in the tire width direction of the center land portion row 200. However, the center land portion row 200 is not necessarily arranged at such a position. Further, the V-shape land portion row 100 may be arranged at the position including the tire equatorial line CL.

Further, the position of each of the shoulder land portion row 300in and the shoulder land portion row 300out is not limited in the shoulder region and therefore the shoulder land portion row 300in and the shoulder land portion row 300out may be arranged in the second region or the like.

Further, in the embodiment described above, both of the sipes 130, 140 and the terminal inclined groove 150 are formed in the V-shape land portion block 101. However, only one of the sipes 130, 140 and the terminal inclined groove 150 may be formed in the V-shape land portion block 101.

Further, in the embodiment described above, the circumferential direction length of the V-shape land portion block 101 is set to be longer than the width direction length of the V-shape land portion block 101. However, the circumferential direction length may be the same as the width direction length.

As described above, the embodiments of the present invention are described, however the present invention is not limited to the description and the drawings forming a part of the present disclosure. Various modifications, examples, and operation techniques will be apparent from the present disclosure to a person skilled in the art.

INDUSTRIAL APPLICABILITY

According to the tire described above, the tire being capable of travelling on ice and snow roads including an ice road surface and capable of deriving performance on the ice road surface, performance on a dry road surface, and especially wear resistant performance at a high level.

REFERENCE SIGNS LIST

10, 10A pneumatic tire
20 tread
30, 40, 50, 60 circumferential direction groove
61 circumferential direction groove portion
62 inclined lug groove portion
70 lug groove
70b groove bottom
80 lug groove
100 V-shape land portion row
100a, 100b, 100c, 100d, 100f, 100g side wall
101, 101A, 101B V-shape land portion block
110 projection portion
110a most projected portion
111, 112 projection portion side wall
120 recess portion
120a most recessed portion
121, 122 recess portion side wall
130 sipe
131 end
140 sipe
141 communication sipe
141a end
142 communication sipe
150 terminal inclined groove
151 end
160 width direction inclined groove
161 inclined groove portion
162 inclined groove portion
163 bent portion
170 notched recess portion
200 center land portion row
201, 202 land portion row
210, 210P land portion block
210a, 210b 210c side wall
220 terminal inclined groove
220c side wall
221 end
230 sipe
231 communication sipe
240 notched groove
241 distal end
260 land portion block
270 crossing inclined groove
271 first groove width portion
272 second groove width portion
273 hook-shaped groove portion
280 terminal inclined groove
281 end
290 sipe
300in, 300out shoulder land portion row
310 land portion block
310a side wall
310b side wall
320 circumferential direction sipe 321 linear portion
322 linear portion
323 apex
330 width direction sipe
331, 332 end
340 width direction sipe
341 end
351, 352 circumferential direction linear sipe
352a, 352b end
360 step portion
361 raised bottom surface
362 end
380 zigzag surface
A1, A2 amplitude
CL tire equatorial line
CT center position
W1, W2 circumferential direction length

The invention claimed is:

1. A tire comprising:
    circumferential direction grooves extended in a tire circumferential direction;
    lug grooves extended in a tire width direction; and
    a compound land portion row formed by a first land portion row and a second land portion row,
    wherein:
    the first land portion row and the second land portion row are arranged adjacent to each other in the tire width direction;
    the first land portion row is formed by first blocks defined by the circumferential direction grooves and the lug grooves and the second land portion row is formed by second blocks defined by the circumferential direction grooves and the lug grooves;
    a plurality of sipes inclined against the tire width direction to extend in the tire width direction are formed in the first blocks and the second blocks;
    side walls located at ends in the tire circumferential direction of the first blocks and the second blocks are inclined against the tire width direction in a tread surface view;
    the side walls are inclined in the opposite direction to the plurality of sipes, and
    as an average sipe interval hc is defined by an average interval of sipes adjacent to each other in the tire circumferential direction of the plurality of sipes in the first blocks and the second blocks arranged at a position including a tire equatorial line, and an average sipe interval hs is defined by an average interval of sipes adjacent to each other in the tire circumferential direction of a plurality of sipes in a shoulder land portion block located at a ground contact end in the tire width direction,
    a relation of $1.05 \leq (hs/hc) \leq 4.00$ is fulfilled.

2. The tire according to claim 1, wherein, as an average sipe interval $h_2$ is defined by an average interval of the sipes adjacent to each other in the tire circumferential direction in a second land portion block located at an outer side in the tire width direction of the first blocks and the second blocks,
    a relation of $1.00 \leq (h_2/hc) \leq 7.00$ is fulfilled.

3. The tire according to claim 1, wherein, as an average sipe interval $h_2$ is defined by an average interval of the sipes adjacent to each other in the tire circumferential direction in a second land portion block located at an outer side in the tire width direction of the first blocks and the second blocks, and an average sipe interval hs is defined by the average interval of the sipes adjacent to each other in the tire circumferential direction in the shoulder land portion block located at the ground contact end in the tire width direction,
    a relation of $1.05 \leq (hs/h_2) \leq 1.27$ is fulfilled.

* * * * *